United States Patent
Bozarth

(10) Patent No.: US 9,557,811 B1
(45) Date of Patent: Jan. 31, 2017

(54) DETERMINING RELATIVE MOTION AS INPUT

(71) Applicant: Amazon Technologies, Inc., Reno, NV (US)

(72) Inventor: Bradley J. Bozarth, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/530,438

(22) Filed: Oct. 31, 2014

Related U.S. Application Data

(63) Continuation of application No. 12/786,297, filed on May 24, 2010, now Pat. No. 8,878,773.

(51) Int. Cl.
*G06F 3/01* (2006.01)
*G06K 9/00* (2006.01)
*G06T 7/00* (2006.01)

(52) U.S. Cl.
CPC ............ *G06F 3/012* (2013.01); *G06K 9/00335* (2013.01); *G06T 7/0044* (2013.01); *G06T 2207/10048* (2013.01); *G06T 2207/30201* (2013.01)

(58) Field of Classification Search
CPC ........ G06F 3/012; G06F 3/0304; G06F 3/042; G06K 9/00; G06K 9/00604; G06K 9/2018; G05G 5/00
See application file for complete search history.

(56) References Cited

U.S. PATENT DOCUMENTS

| | | |
|---|---|---|
| 4,836,670 A | 6/1989 | Hutchinson |
| 5,563,988 A | 10/1996 | Maes et al. |
| 5,616,078 A | 4/1997 | Oh |
| 5,850,211 A | 12/1998 | Tognazzini |
| 5,999,091 A | 12/1999 | Wortham |
| 6,072,496 A | 6/2000 | Guenter et al. |
| 6,163,336 A * | 12/2000 | Richards ............ G02B 27/0093 348/42 |

(Continued)

FOREIGN PATENT DOCUMENTS

| | | |
|---|---|---|
| CN | 1694045 | 11/2005 |
| GB | 2350712 | 12/2000 |

(Continued)

OTHER PUBLICATIONS

Author Unknown, "Face Detection, Technology puts portraits in focus," Consumerreports.org, 2007, 1 page.

(Continued)

*Primary Examiner* — Kenneth Bukowski
(74) *Attorney, Agent, or Firm* — Polsinelli LLP

(57) ABSTRACT

Input can be provided to a computing device based upon relative movement of a user or other object with respect to the device. In some embodiments, infrared radiation is used to determine measurable aspects of the eyes or other of a user. Since the human retina is a retro-reflector for certain wavelengths, using two different wavelengths or two measurement angles can allow user pupils to be quickly located and measured without requiring resource-intensive analysis of full color images captured using ambient light, which can be important for portable, low power, or relatively inexpensive computing devices. Various embodiments provide differing levels of precision and design that can be used with different devices.

19 Claims, 9 Drawing Sheets

(56) References Cited

U.S. PATENT DOCUMENTS

| | | |
|---|---|---|
| 6,250,928 B1 | 6/2001 | Poggio et al. |
| 6,272,231 B1 | 8/2001 | Maurer et al. |
| 6,330,023 B1 | 12/2001 | Chen |
| 6,385,331 B2 | 5/2002 | Harakawa et al. |
| 6,392,667 B1 | 5/2002 | McKinnon et al. |
| 6,429,810 B1 | 8/2002 | De Roche |
| 6,434,255 B1 | 8/2002 | Harakawa |
| 6,523,025 B1 | 2/2003 | Hashimoto et al. |
| 6,539,354 B1 | 3/2003 | Sutton et al. |
| 6,735,566 B1 | 5/2004 | Brand |
| 6,750,848 B1 | 6/2004 | Pryor |
| 6,863,609 B2 | 3/2005 | Okuda et al. |
| 6,864,912 B1 * | 3/2005 | Mahaffey ............... G06F 3/012 348/14.01 |
| 6,865,516 B1 | 3/2005 | Richardson |
| 6,956,566 B2 | 10/2005 | Gelb |
| 6,959,102 B2 | 10/2005 | Peck |
| 7,033,025 B2 | 4/2006 | Winterbotham |
| 7,092,554 B2 | 8/2006 | Chen et al. |
| 7,095,401 B2 | 8/2006 | Liu et al. |
| 7,104,891 B2 | 9/2006 | Osako et al. |
| 7,142,709 B2 | 11/2006 | Girard |
| 7,168,953 B1 | 1/2007 | Poggio et al. |
| 7,199,767 B2 | 4/2007 | Spero |
| 7,301,526 B2 | 11/2007 | Marvit et al. |
| 7,379,566 B2 | 5/2008 | Hildreth |
| 7,401,783 B2 | 7/2008 | Pryor |
| 7,519,223 B2 | 4/2009 | Dehlin et al. |
| 7,565,680 B1 | 7/2009 | Asmussen |
| 7,584,158 B2 | 9/2009 | Iwaki et al. |
| 7,605,837 B2 | 10/2009 | Yuen et al. |
| 7,675,539 B2 | 3/2010 | Matsui |
| 7,688,306 B2 | 3/2010 | Wehrenberg et al. |
| 7,701,448 B2 | 4/2010 | Nakamura et al. |
| 7,853,050 B2 | 12/2010 | Wang et al. |
| 7,924,272 B2 | 4/2011 | Boer et al. |
| 8,063,938 B2 | 11/2011 | Ueki |
| 8,064,647 B2 | 11/2011 | Bazakos et al. |
| 8,139,059 B2 | 3/2012 | Trepte |
| 8,350,896 B2 | 1/2013 | Kawakami et al. |
| 8,644,565 B2 | 2/2014 | Du et al. |
| 8,670,019 B2 | 3/2014 | Byers |
| 8,712,470 B2 | 4/2014 | Cho |
| 8,725,507 B2 | 5/2014 | Cortez et al. |
| 8,788,977 B2 | 7/2014 | Bezos |
| 8,878,773 B1 | 11/2014 | Bozarth |
| 8,942,434 B1 | 1/2015 | Karakotsios et al. |
| 8,947,351 B1 | 2/2015 | Noble |
| 9,041,734 B2 | 5/2015 | Look et al. |
| 9,094,576 B1 | 7/2015 | Karakotsios |
| 2002/0071277 A1 | 6/2002 | Starner et al. |
| 2002/0111819 A1 | 8/2002 | Li et al. |
| 2002/0180799 A1 | 12/2002 | Peck et al. |
| 2003/0004792 A1 | 1/2003 | Townzen et al. |
| 2003/0028577 A1 | 2/2003 | Dorland et al. |
| 2003/0069648 A1 | 4/2003 | Douglas et al. |
| 2003/0142068 A1 | 7/2003 | DeLuca et al. |
| 2003/0179073 A1 | 9/2003 | Ghazarian |
| 2004/0026529 A1 | 2/2004 | Float et al. |
| 2004/0107106 A1 | 6/2004 | Margaliot et al. |
| 2004/0140956 A1 | 7/2004 | Kushler et al. |
| 2004/0174496 A1 | 9/2004 | Ji et al. |
| 2004/0190759 A1 | 9/2004 | Caldwell |
| 2005/0108162 A1 | 5/2005 | Sugihara |
| 2005/0133693 A1 | 6/2005 | Fouquet et al. |
| 2005/0162381 A1 | 7/2005 | Bell et al. |
| 2005/0175218 A1 | 8/2005 | Vertegaal et al. |
| 2005/0207614 A1 | 9/2005 | Schonberg et al. |
| 2005/0216867 A1 | 9/2005 | Marvit et al. |
| 2005/0248529 A1 | 11/2005 | Endoh |
| 2005/0275638 A1 | 12/2005 | Kolmykov-Zotov et al. |
| 2006/0009978 A1 | 1/2006 | Ma et al. |
| 2006/0018623 A1 | 1/2006 | Yu et al. |
| 2006/0020898 A1 | 1/2006 | Kim et al. |
| 2006/0038881 A1 * | 2/2006 | Starkweather ..... H04N 13/0402 348/51 |
| 2006/0077347 A1 | 4/2006 | Liang et al. |
| 2006/0109422 A1 | 5/2006 | Clark et al. |
| 2006/0147094 A1 | 7/2006 | Yoo |
| 2006/0210045 A1 | 9/2006 | Valliath et al. |
| 2006/0256133 A1 | 11/2006 | Rosenberg |
| 2006/0257026 A1 | 11/2006 | Shiffer et al. |
| 2006/0269105 A1 | 11/2006 | Langlinais |
| 2007/0025598 A1 | 2/2007 | Kobayashi et al. |
| 2007/0064112 A1 | 3/2007 | Chatting et al. |
| 2007/0071277 A1 | 3/2007 | Van Der Veen et al. |
| 2007/0164989 A1 | 7/2007 | Rochford et al. |
| 2007/0189582 A1 | 8/2007 | Hamza et al. |
| 2008/0005418 A1 | 1/2008 | Julian |
| 2008/0013826 A1 | 1/2008 | Hillis et al. |
| 2008/0019589 A1 | 1/2008 | Yoon et al. |
| 2008/0040692 A1 | 2/2008 | Sunday et al. |
| 2008/0069438 A1 | 3/2008 | Winn et al. |
| 2008/0084518 A1 | 4/2008 | Brott et al. |
| 2008/0122803 A1 | 5/2008 | Izadi et al. |
| 2008/0123734 A1 | 5/2008 | Lin et al. |
| 2008/0136895 A1 | 6/2008 | Mareachen |
| 2008/0136915 A1 | 6/2008 | Iwamura |
| 2008/0136916 A1 | 6/2008 | Wolff |
| 2008/0140481 A1 | 6/2008 | Gold |
| 2008/0151786 A1 | 6/2008 | Li et al. |
| 2008/0158096 A1 | 7/2008 | Breed |
| 2008/0158145 A1 | 7/2008 | Westerman |
| 2008/0158407 A1 * | 7/2008 | Funamoto ........... G06K 9/00228 348/345 |
| 2008/0170759 A1 | 7/2008 | Monro |
| 2008/0174570 A1 | 7/2008 | Jobs et al. |
| 2008/0211813 A1 | 9/2008 | Jamwal et al. |
| 2008/0253622 A1 | 10/2008 | Tosa et al. |
| 2008/0266289 A1 | 10/2008 | Park |
| 2008/0266530 A1 | 10/2008 | Takahashi et al. |
| 2008/0276196 A1 | 11/2008 | Tang |
| 2008/0291488 A1 | 11/2008 | Lin et al. |
| 2008/0298571 A1 | 12/2008 | Kurtz et al. |
| 2009/0031240 A1 | 1/2009 | Hildreth |
| 2009/0079813 A1 | 3/2009 | Hildreth |
| 2009/0110248 A1 * | 4/2009 | Masuda ............... G06F 21/32 382/118 |
| 2009/0115966 A1 | 5/2009 | Waldorf et al. |
| 2009/0128499 A1 | 5/2009 | Izadi et al. |
| 2009/0154807 A1 | 6/2009 | Rossato et al. |
| 2009/0184981 A1 | 7/2009 | de Matos |
| 2009/0196460 A1 | 8/2009 | Jakobs et al. |
| 2009/0210789 A1 | 8/2009 | Thakkar et al. |
| 2009/0217210 A1 | 8/2009 | Zheng et al. |
| 2009/0265627 A1 | 10/2009 | Kim et al. |
| 2009/0296989 A1 | 12/2009 | Ramesh et al. |
| 2009/0313584 A1 | 12/2009 | Kerr et al. |
| 2010/0002912 A1 | 1/2010 | Solinsky |
| 2010/0014718 A1 | 1/2010 | Savvides et al. |
| 2010/0014720 A1 | 1/2010 | Hoyos et al. |
| 2010/0023878 A1 | 1/2010 | Douris et al. |
| 2010/0050133 A1 | 2/2010 | Nishihara et al. |
| 2010/0066676 A1 | 3/2010 | Kramer et al. |
| 2010/0079426 A1 | 4/2010 | Pance et al. |
| 2010/0097332 A1 | 4/2010 | Arthur et al. |
| 2010/0103172 A1 | 4/2010 | Purdy, Sr. |
| 2010/0103244 A1 | 4/2010 | Brandsma et al. |
| 2010/0111416 A1 | 5/2010 | Meiers |
| 2010/0124941 A1 | 5/2010 | Cho |
| 2010/0125816 A1 | 5/2010 | Bezos |
| 2010/0169840 A1 | 7/2010 | Chen et al. |
| 2010/0182325 A1 | 7/2010 | Cederwall et al. |
| 2010/0225743 A1 * | 9/2010 | Florencio ........... H04N 13/0014 348/46 |
| 2010/0306335 A1 | 12/2010 | Rios et al. |
| 2010/0321292 A1 * | 12/2010 | Zhao ..................... G06F 3/038 345/157 |
| 2011/0006978 A1 | 1/2011 | Yuan |
| 2011/0026014 A1 | 2/2011 | Mack et al. |
| 2011/0026609 A1 | 2/2011 | Sitrick |
| 2011/0109726 A1 | 5/2011 | Hwang et al. |
| 2011/0128223 A1 | 6/2011 | Lashina et al. |

(56) References Cited

U.S. PATENT DOCUMENTS

| | | |
|---|---|---|
| 2011/0128365 A1 | 6/2011 | Ren et al. |
| 2011/0131041 A1 | 6/2011 | Cortez et al. |
| 2011/0141436 A1 | 6/2011 | Ono |
| 2011/0145718 A1 | 6/2011 | Ketola et al. |
| 2011/0221667 A1 | 9/2011 | Lee |
| 2011/0243388 A1 | 10/2011 | Sakaguchi et al. |
| 2011/0262010 A1 | 10/2011 | Thörn |
| 2011/0314427 A1 | 12/2011 | Sundararajan |
| 2011/0316853 A1 | 12/2011 | Bar-Zeev et al. |
| 2012/0005632 A1 | 1/2012 | Broyles et al. |
| 2012/0027252 A1 | 2/2012 | Liu et al. |
| 2012/0058565 A1 | 3/2012 | Berkelman et al. |
| 2012/0086629 A1 | 4/2012 | Thörn |
| 2012/0086647 A1 | 4/2012 | Birkler |
| 2012/0124603 A1 | 5/2012 | Amada |
| 2012/0206333 A1 | 8/2012 | Kim |
| 2012/0323581 A1 | 12/2012 | Strietzel et al. |
| 2012/0327196 A1 | 12/2012 | Ohba et al. |
| 2013/0004016 A1 | 1/2013 | Karakotsios et al. |
| 2013/0038609 A1 | 2/2013 | Tsai et al. |
| 2013/0141643 A1 | 6/2013 | Carson et al. |
| 2013/0257876 A1 | 10/2013 | Davis |
| 2013/0257877 A1 | 10/2013 | Davis |
| 2013/0293530 A1 | 11/2013 | Perez et al. |
| 2014/0118346 A1 | 5/2014 | Tsai et al. |
| 2014/0232745 A1 | 8/2014 | Cho |
| 2014/0285435 A1 | 9/2014 | Bezos |

FOREIGN PATENT DOCUMENTS

| | | |
|---|---|---|
| GB | 2440348 | 1/2008 |
| JP | 2002-164990 | 6/2002 |
| JP | 2002-351603 | 12/2002 |
| JP | 2004-271671 | 9/2004 |
| JP | 2004-318826 | 11/2004 |
| JP | 2007-121489 | 5/2007 |
| JP | 2008-097220 | 4/2008 |
| JP | 2008-516352 | 5/2008 |
| JP | 2008-129775 | 6/2008 |
| JP | 2010-122879 | 6/2010 |
| WO | WO 02/15560 | 2/2002 |
| WO | WO 2006/036069 | 4/2006 |

OTHER PUBLICATIONS

Author Unknown, "faceshift documentation: faceshift studio beta," 2012, 12 pages, available at http://www.faceshift.com/help/studio/beta/.

Author Unknown, "Introducing Wii MotionPlus, Nintendo's upcoming accessory for the revolutionary Wii Remote at Nintendo:: What's New," Nintendo Games, Jul. 14, 2008, 2 pages, available at http://www.nintendo.com/whatsnew/detail/eMMuRj_N6vntHPDycCJAKWheO9zBvyPH.

Author Unknown, "Nokia N95 8GB Data Sheet," Nokia, 2007, 1 page.

Brashear, Helene, et al., "Using Multiple Sensors for Mobile Sign Language Recognition," International Symposium on Wearable Computers, 2003, 8 pages.

Cappelletta, Luca, et al., "Phoneme-To-Viseme Mapping for Visual Speech Recognition," Department of Electronic and Electrical Engineering, Trinity College Dublin, Ireland, 2012, 8 pages.

Cornell, Jay, "Does This Headline Know You're Reading It?," Mar. 19, 2010, 4 pages.

Haro, Antonio, et al., "Mobile Camera-Based Adaptive Viewing," MUM '05 Proceedings of the 4th International Conference on Mobile and Ubiquitous Mulitmedia, 2005, 6 pages.

Padilla, Raymond, "Eye Toy (PS2)," Aug. 16, 2003, 2 pages, available at http://www..archive.gamespy.com/hardware/august03/eyetoyps2/index.shtml.

Schneider, Jason, "Does Face Detection Technology Really Work?" May 21, 2007, available at http://www.adorama.com/catalog.tpl?article=052107&op=academy_new 5 pages.

Tyser, Peter, "Control an iPod with gestures," Sep. 11, 2005, 4 pages, available at http://www.videsignline.com/howto/170702555.

Van Den Berg, Thomas J. T. P., et al., "Near Infrared Light Absorption in the Human Eye Media", Vision Res., vol. 37, No. 2, 1997, pp. 249-253.

Zyga, Lisa, "Hacking the Wii Remote for Physics Class," Jul. 24, 2007, 2 pages, available at http://www.physorg.com/news104502773.html.

\* cited by examiner

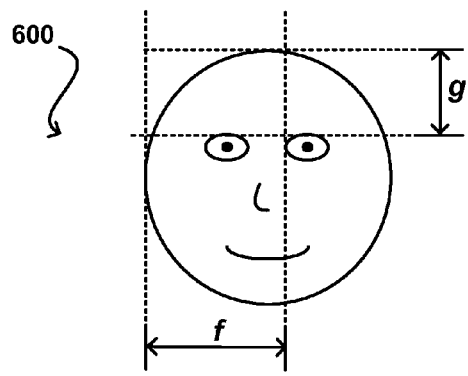
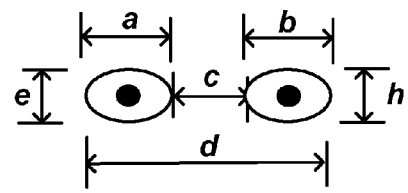
FIG. 6 (a)　　　　　FIG. 6 (b)
FIG. 7(a)　　　FIG. 7 (b)　　　FIG. 7 (c)
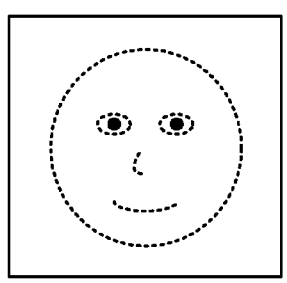
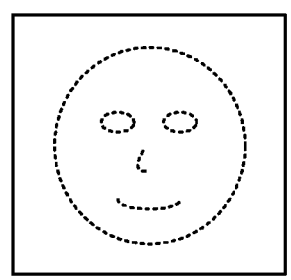
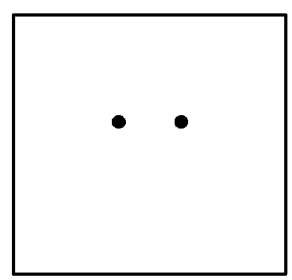
FIG. 8 (a)　　　FIG. 8 (b)　　　FIG. 8 (c)

DETERMINING RELATIVE MOTION AS INPUT

CROSS-REFERENCES TO RELATED APPLICATIONS

This application is a continuation of allowed U.S. application Ser. No. 12/786,297, entitled "DETERMINING RELATIVE MOTION AS INPUT," filed May 24, 2010; of which the full disclosure of this application is incorporated herein by reference for all purposes.

BACKGROUND

As the variety of available computing devices increases, and as the size of many of these devices decreases, there comes a need to adapt the ways in which users interface with these computing devices. For example, while typing on a keyboard is an easy and acceptable way for many users to input information for a desktop computer, trying to enter information on a keyboard of a portable phone can be difficult due to the small form factor of the device. For example, the size of a user's fingers can prevent that user from easily pressing one key at a time. Further, as many of these devices move to touch screens or other such input devices, the size of a user's finger can also inhibit the user from successfully selecting an intended object or element on the screen, etc. Another disadvantage to using such touch screens is that fingerprints, dirt, smudges, and other remnants are left on the display screen, which can cause glare or other issues with clarity and/or visibility. Some users add an extra layer of protective material to prevent damage to the screen, but these devices can reduce touch sensitivity and amplify the negative effects of the residue left on the screen.

Some portable devices utilize movement of the device as a type of input, wherein a user can tilt a device in a particular direction to provide a specific input. The types of input that can be provided by such mechanisms are limited, and require that the user be holding the device in order to provide the input. Further, the device does not account for relative motion. For example, if the user lies down while using the device the change in orientation might cause the device to register input even though the relative orientation of the device with respect to the user is substantially unchanged.

BRIEF DESCRIPTION OF THE DRAWINGS

Various embodiments in accordance with the present disclosure will be described with reference to the drawings, in which:

FIGS. 6(a)-6(b) illustrate analysis of facial features of a user in accordance with various embodiments;

FIGS. 7(a)-7(c) illustrate an example of capturing eye movement of a user as input in accordance with one embodiment;

FIGS. 8(a)-8(c) illustrate an approach to determining retina location from a pair of images that can be used in accordance with one embodiment;

DETAILED DESCRIPTION

Figure 1:
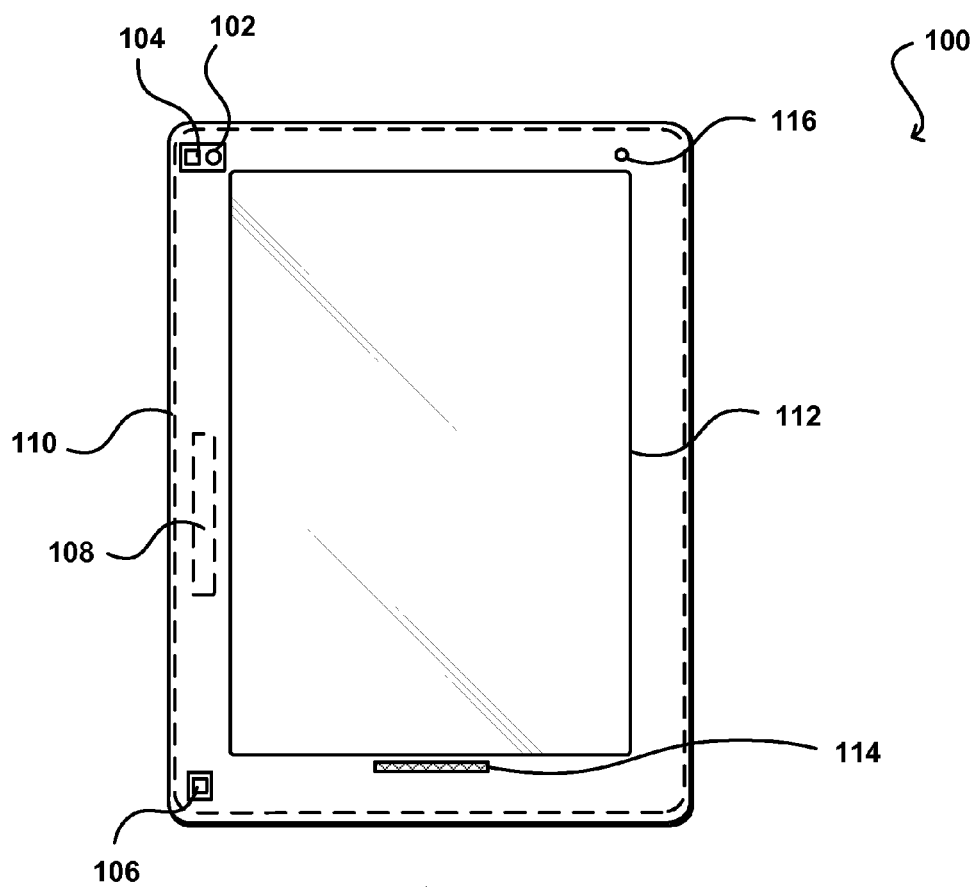
FIG. 1 illustrates an example device including components that can be used to provide input in accordance with various embodiments.

Systems and methods in accordance with various embodiments of the present disclosure may overcome one or more of the aforementioned and other deficiencies experienced in conventional approaches to providing input to a computing device. In particular, approaches discussed herein enable the device to determine and/or track the relative position, orientation, and/or motion of at least one aspect of a user, or other object, with respect to the device, which can be interpreted as input to the computing device.

In one embodiment, at least one image capture element of a computing device is used to image at least a portion of a user. The image capture element can utilize ambient light surrounding the device or user, or can rely upon light emitted from a display element or other component of the electronic device. In other embodiments, at least one image capture element is used that captures infrared (IR) or other radiation emitted from a component (e.g., an emitter such as an IR light emitting diode (LED) or laser diode) of the computing device, and reflected by the user. In some embodiments, both an ambient light camera and one or more infrared detectors are used to determine aspects of relative position and/or movement.

Certain approaches can utilize image recognition to track aspects of a user for use in providing input to the device. Examples of such approaches can be found in co-pending U.S. patent application Ser. No. 12/332,049, filed Dec. 10, 2008, entitled "Movement Recognition as Input Mechanism," which is hereby incorporated herein by reference. For certain portable or low power devices, however, standard image recognition using ambient light and full color images may not be optimal, as the analysis can require a significant amount of processing capacity, resource usage, battery power, and other such aspects. Further, for device control purposes it can be desirable in at least some embodiments to monitor the user at a rate of 30 frames per second or faster, which can be difficult (or at least particularly resource and power intensive) when full color images must be analyzed. In some cases a significant amount of the processing can be pushed to a remote processing system, but latency, bandwidth, and other such issues can prevent such an approach from working in all cases.

Accordingly, several embodiments described and suggested herein utilize infrared radiation, or other ranges of radiation that are outside the range of viewable light that is detectable by a human user. In addition to being imperceptible by a user, such that the user experience is not degraded if the user is illuminated with such radiation, IR can provide a relatively inexpensive tracking mechanism by taking advantage of the properties of the human eyes to obtain at least one point source. For example, the human retina is a retro-reflector, such that light is reflected back at substantially the same angle in which the light was incident on the retina. Thus, light from one angle will not be reflected back from the retina along another (substantially different) angle. Further, the human eye absorbs certain wavelengths, such that light of one wavelength may be reflected by the retina while light of another wavelength may be absorbed by the cornea and/or other portions of the eye, or otherwise not reflected back.

These properties enable two images to be captured that can be low-color or grayscale in nature, as the portions of interest will either show reflection or show little to no reflection at the position of the pupils, for example. If one image is captured that includes the reflected light from the retinas, and another image is captured that does not include the reflected light, the images can be compared to quickly determine the relative location and dimensions of the user's pupils (or other such features). Since other features of the user will generally reflect the same for each image, an image comparison can readily reveal the relative position of the pupils without a significant amount of image processing.

In various embodiments, a running difference can be performed between images including (and not including) the light reflected from the retinas. Subtracting the absolute values of the pairs of images will leave substantially two disc-shaped features corresponding to the relative positions of the user's pupils (as well as those of anyone else in the view) such that changes in position or direction can quickly be determined and monitored over time. There can be features in the subtracted image pairs that result from movement or other occurrences, but these features typically will not be disc shaped and can readily be removed from consideration.

In some embodiments, a conventional digital camera or similar device can be used to perform a rough head location for a user. Any of a number of conventional image analysis approaches can be used to approximate the head position of a user. This approximation can be used to further reduce the resources needed to process IR images, for example, as the device can know ahead of time the approximate location of the user's head and can exclude areas substantially outside that area from consideration or analysis. In some embodiments that must account for image offset due to the use of multiple cameras, a representative portion can be selected from one IR image, such as may be based upon distinctive features or some other such aspect within the determined head region of the user, and an algorithm can attempt to match that portion with a region of the other IR image that can be based, at least in part, upon the head position of the user. The matching process thus can use a sliding window and utilize a maximum match value, minimum difference value, or other such value to determine the likely match position. An additional benefit of determining the image offset for the match position, in addition to being able to align the images, is that the offset can indicate an approximate distance to the object (e.g., user) being imaged. The distance can be useful in properly interpreting movement, such as to determine gaze direction of a user.

Many other alternatives and variations are described and suggested below in relation to at least some of the various embodiments.

FIG. 1 illustrates an example of an electronic computing device 100 that can be used in accordance with various embodiments. This example device includes a display element 112 for displaying information to a user as known in the art. The example device also includes at least one orientation-determining element 108, such as an accelerometer or gyro element, which can be used to determine orientation and/or motion of the device, which can help to interpret motion in a captured image using various approaches described herein. The device also includes at least one image capture element for capturing image information about the user of the device. The imaging element may include, for example, a camera, a charge-coupled device (CCD), a motion detection sensor, or a radiation sensor, among many other possibilities. The example device in FIG. 1 includes an infrared (IR) emitter 102 and two IR detectors 104, 106 (although a single detector and two emitters could be used as well within the scope of the various embodiments). In other embodiments, as discussed herein, a device could instead include two ambient light cameras in place of the two detectors 104, 106, and can utilize ambient light and/or light from the display element 112. The IR emitter 102 can be configured to emit IR radiation, and each detector can detect the IR radiation reflected from a user (or other such surface or object). By offsetting the detectors in this example, each detector will detect radiation reflected at different angles.

In the example illustrated in FIG. 1, a first IR detector 104 is positioned substantially adjacent to the IR emitter 102 such that the first IR detector will be able to capture the infrared radiation that is reflected back from a surface, such as a viewer's retinas, in a direction that is substantially orthogonal to the capture plane of the detector. The second IR detector 106 is positioned a distance away from the IR emitter 102 such that the detector will only detect IR radiation reflected at an angle with respect to the orthogonal direction. When imaging a retro-reflector such as a user's retina, the second IR emitter will detect little to no reflected radiation due to the IR emitter, as the retina will not significantly reflect in the direction of the second emitter (although defects, particulates, or variations may deflect some of the radiation). As discussed later herein, this difference among images can be used to determine the position (and other aspects) of the retinas of a user, as the difference in IR reflection between the two images will be significant near the pupils or other such features, but the remainder of the images will be substantially similar.

In an alternative embodiment, a computing device utilizes a pair of IR emitters (e.g., IR light emitting diodes (LEDs), IR laser diodes, or other such components), to illuminate a user's face in a way that is not distracting (or even detectable) to the user, with the reflected light being captured by a single IR sensor. The LEDs are separated a sufficient distance such that the sensor will detect reflected radiation from a pupil when that radiation is emitted from the LED near the sensor, and will not detect reflected radiation from the pupil when that radiation is emitted from the LED positioned away from the sensor. The sensor can capture IR images that enable the device to analyze features of the user that reflect IR light, such as the pupils or teeth of a user. An algorithm can attempt to calculate a position in three-dimensional space (x, y, z) that corresponds to a location equidistant between the user's eyes, for example, and can use this position to track user movement and/or determine head motions. A similar approach can be used that utilizes a single IR emitting diode and a pair of IR sensors, as discussed above. Thus, the device can either direct IR from two locations or detect IR from two locations, with only one of those locations receiving retro-reflected radiation from a user's retinas. Other embodiments can utilize other approaches for performing head tracking, such as by requiring a user to wear glasses that emit IR radiation from a point source, etc.

In some embodiments it can be preferable to utilize a single emitter and two cameras when using single wavelength IR (e.g., 940 nm) in two directions, as using a single camera might be cheaper but also requires that images from the different directions be captured at different times. A downside to capturing images at different times is that movement during that period can affect the determination, even for capture frequencies on the order of 30 Hz (or 15 Hz for two cameras to get the same resolution). An advantage to a multi-camera system is that the images can be captured substantially simultaneously, such that movement between images is minimized. A potential downside to such an approach, however, is that there can be optical variations in the images due to the images being captured from two different points of view.

In one embodiment, a single detector can be used to detect radiation reflected at two different wavelengths. For example, a first LED could emit radiation at a wavelength (e.g., 940 nm) that is reflected by the retina, and a second LED could emit radiation at a wavelength (e.g., 1100 nm) that is absorbed by the cornea and/or other portions of the human eye. Specific wavelengths can be selected within selected wavelength ranges, based at least in part upon their reflective properties with respect to the human eye. For example, experiments indicate that light has less than a 50% absorption rate (for the typical human eye) under about 940 nm, above 50% absorption between about 940 nm and about 1030 nm, around 50% absorption for wavelengths between about 1040 nm and about 1100 nm, and about 100% absorption at 1150 nm and above. Thus, emitters can be selected that fall within at least some of these ranges, such as a first IR emitter that has significantly less that 50% absorption and a second IR emitter that has significantly greater than 50% absorption. The specific wavelengths can further be based, in at least some embodiments, upon the wavelengths of available devices. For example, an available laser diode at 904 nm can be selected that has a relatively low absorption rate, and an available laser diode at 980 nm or 1064 nm can be selected that has a relatively high absorption rate. In some embodiments, the power output of the higher wavelength diode can be scaled up to substantially match the perceived brightness of the lower wavelength diode by a CMOS sensor (or other such detector), the sensitivity of which might fall off to around zero at a value of about 1100 nm, such that in at least one embodiment the two emitters have wavelengths of 910 nm and 970 nm).

An advantage to using two wavelengths is that the LEDs can emit the radiation simultaneously, as long as a resulting image is able to be decomposed in order to extract image information corresponding to each wavelength. Various approaches for decomposing such an image are discussed elsewhere herein. The LEDs then could both be positioned near the camera, or a single LED or emitter can be used near the camera if that LED operates at (at least) the two frequencies of interest.

The emitter(s) and detector(s), and any ambient light camera(s) or other image capture element(s), can be positioned on the device in locations that are least likely to interfere with the user's operation of the device. For example, if it is determined that average users hold the device by the middle of either side of the device and primarily on the right side or on the bottom of the device, then the emitter and detectors can be positioned at the corners of the device, primarily on the left-hand side or top of the device. In another embodiment, there may be additional IR emitters (not shown) positioned on the device that transmit IR at different frequencies. By detecting which frequencies are received by the detectors, the device can determine specific information as to the orientation of the users gaze.

In some embodiments, it might be useful for a user to participate in a calibration process which accounts for aspects such as the strength of eye reflection from the user, as well as to determine dimensions, calibrate gaze direction determinations, etc. Such an approach also can be useful if a user uses glasses that reduce the reflective capability, etc.

As discussed, using multiple input mechanisms can help to interpret information captured about each viewer, such as the movement of a viewer's pupils or other features. For example, the device can include a touch-sensitive element 110 around at least a portion of the device 100. A material similar to that used with a touch-sensitive display element can be used on the back and/or sides of the device. Using such material, the device is able to determine whether a user is actively holding the device. Such information could be used to perform a first input for detected motion if the user is holding the device, and a second input if the user is not holding the device. In addition to determining whether the user is holding the device, the system can determine, through use of the touch-sensitive element, which portions of the device are covered by the user. In such an embodiment, multiple IR emitters may be positioned on the device at different locations, and based on where the user is holding the device (i.e., which IR emitters are covered vs. not covered), the system can determine which IR emitters to use when capturing images.

The example device in FIG. 1 also includes a light-detecting element 116 that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear) and privacy detection to be temporarily disabled. The light-detecting element could be used in conjunction with information from other elements to adjust the functionality of the device.

Further, a light-detecting sensor can help the device compensate for large adjustments in light or brightness, which can cause a user's pupils to dilate, etc. For example, when a user is operating a device in a dark room and someone turns on the light, the diameters of the user's pupils will change. As with the example above, if the device includes a display element that can operate in different modes, the device may also switch modes based on changes in the user's pupil dilation. In order for the device to not improperly interpret a change in separation between the device and user, the light detecting sensor might cause gaze tracking to be temporarily disabled until the user's eyes settle and a recalibration process is executed. Various other such approaches to compensate for light variations can be used as well within the scope of the various embodiments.

The example device 100 in FIG. 1 is shown to also include a microphone 114 or other such audio-capturing device. The device in at least some embodiments can also determine various actions based upon sound detected by the microphone. For example, if the device is in a pocket or bag, for example, the microphone might be significantly covered by a material, which can affect the quality of sound recorded. The device then can lock out certain functionality, such as to at least temporarily disable image tracking.

In the example configuration of FIG. 1, each imaging element 104, 106 is on the same general side of the computing device as a display element, such that when a user is viewing the interface in the display element the imaging element has a viewable area that, according to this example, includes the face of the user. While in some embodiments the imaging element is fixed relative to the device, in other embodiments the imaging element can be operable to track the position of the user, such as by rotating the imaging element or an optical element (e.g., a lens, mirror, etc.) that directs light to the imaging element. Although embodiments described herein use examples of the viewable area including the face of the user, the viewable area may include other portions of the body such as arms, legs, and hips, among other possibilities. In any case, the viewable area of an imaging element can be configured to obtain image information corresponding to at least a portion of a user operating the device, and if the imaging element is continually (or at least substantially continually) capturing or otherwise obtaining image information, then any movement of the user relative to the device (through movement of the user, the device, or a combination thereof) can cause a position or orientation of at least one aspect of that user within the viewable area to change.

Figure 2:
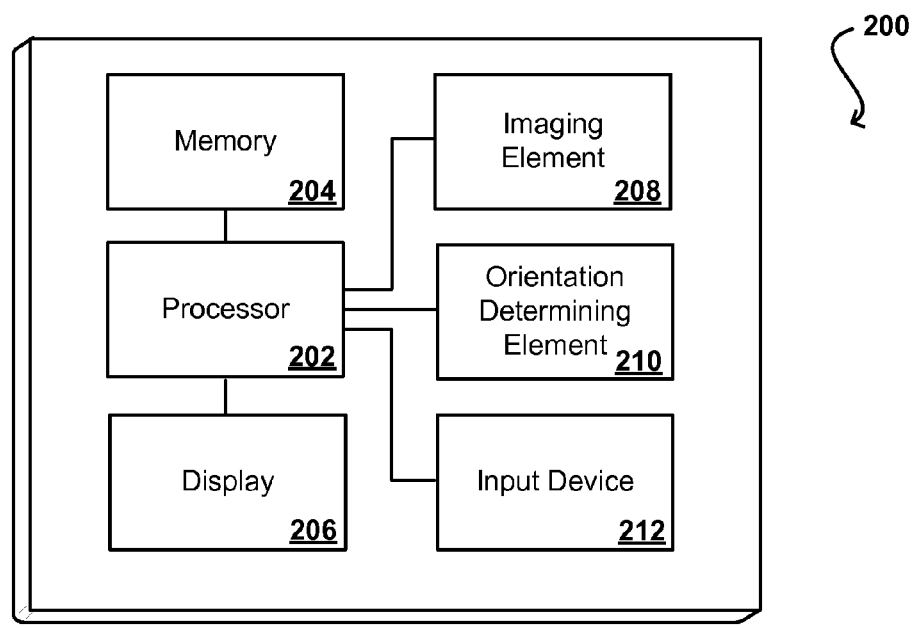
FIG. 2 illustrates an example component-level view of a device that can be used in accordance with various embodiments.

FIG. 2 illustrates a set of basic components of an example computing device 200 such as the devices described with respect to FIG. 1. While a portable smart device is depicted in many examples herein, the computing device could be any appropriate device able to receive and process input commands, such as a personal computer, laptop computer, television set top box, cellular phone, PDA, electronic book reading device, video game system, or portable media player, among others. In this example, the device includes a processor 202 for executing instructions that can be stored in a memory device or element 204. As known in the art, the device can include many types of memory, data storage or computer-readable media, such as a first data storage for program instructions for execution by the processor 202, a separate storage for images or data, a removable memory for sharing information with other devices, etc. The device typically will include some type of display element 206, such as a liquid crystal display (LCD), although devices such as portable media players might convey information via other means, such as through audio speakers. As discussed, the device in many embodiments will include at least one imaging element 208 such as a camera, sensor, or detector that is able to image a facial region of a user. The imaging element can include any appropriate technology, such as a CCD imaging element having a sufficient resolution, focal range and viewable area to capture an image of the user when the user is operating the device. Methods for capturing images using an imaging element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application or other device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element 210 that is able to determine a current orientation of the device 200. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

In some embodiments, the device can include at least one additional input device 212 able to receive conventional input from a user. This conventional input can include, for example, a push button, touch pad, touch-sensitive element used with a display, wheel, joystick, keyboard, mouse, keypad or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device. As will be discussed later herein, functionality of these additional input devices can also be adjusted or controlled based at least in part upon the determined gaze direction of a user or other such information.

Figure 3:
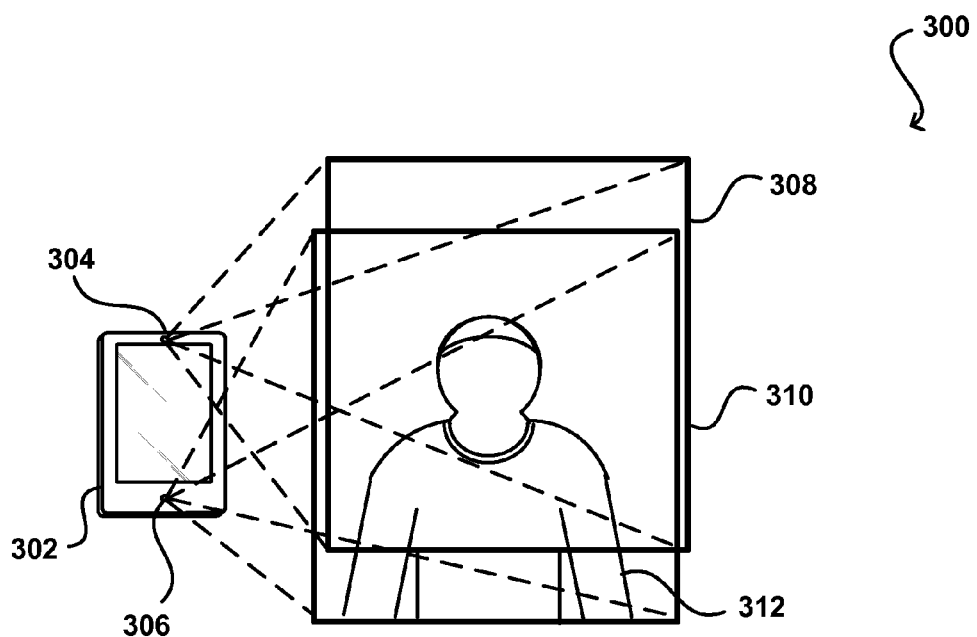
FIG. 3 illustrates a configuration wherein a device with two imaging elements captures two images of a user in accordance with one embodiment.

When using a computing device with multiple capture elements separated some distance on the device, there will be some lateral offset of objects contained in images captured by those elements. For example, FIG. 3 illustrates an example configuration 300 wherein a computing device 302 has a first image capture element 304 positioned near a top edge of the device and a second image capture element 306 positioned near a bottom edge of the device. Unless the device has adjustable capture elements and image alignment software, the image capture elements likely will point in a direction substantially orthogonal to the plane of the device face corresponding to each element. Thus, the field of view of each camera will be different, with a lateral offset corresponding substantially to the lateral distance between the image capture elements and the distance to the object being imaged. In FIG. 3, the image capture elements are capturing image information corresponding to a user 312 of the device. The field of view 308 corresponding to the first image capture element 304 at a distance corresponding to a position of the user 312 will be slightly above the field of view 310 of the second image capture element 306.

Figures 4A, 4B:
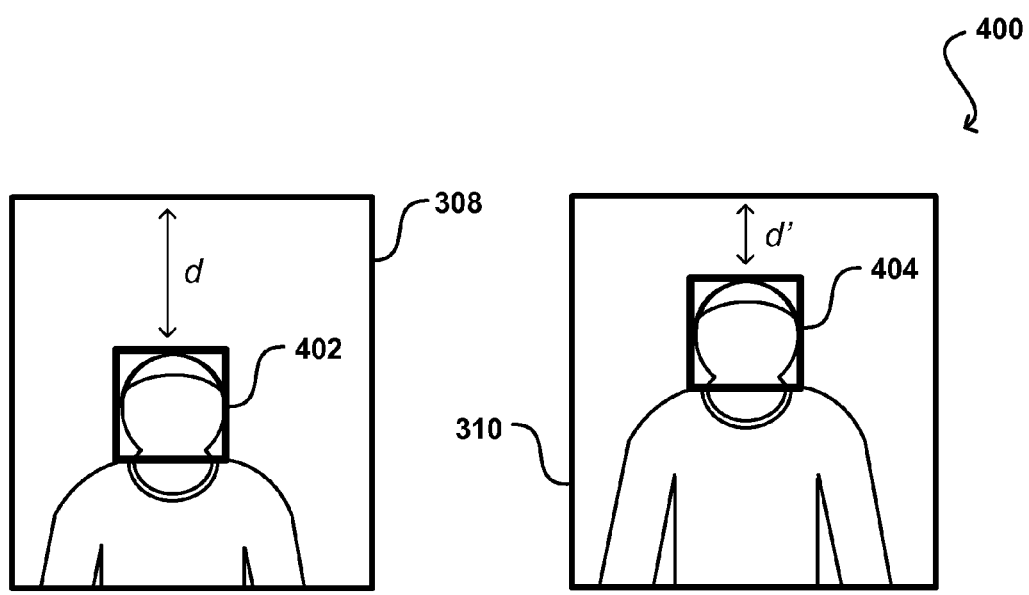
FIGS. 4(a) and (b) illustrate different head positions of a user in images captured from offset cameras in accordance with one embodiment.

FIGS. 4(a) and 4(b) illustrate example images 400 captured by the first and second image capture elements, respectively, in the example of FIG. 3. In FIG. 4(a) the image corresponds substantially to the field of view 308 of the first image capture element 304. Image analysis software can use any of a number of algorithms known in the art or subsequently developed to locate an approximate position of a person's head in the image. In this example, the software generates a virtual box 402 surrounding the position of the user's head in the image. The distance from the top of the virtual box to the top of the image is a first distance d.

In FIG. 4(b) the image corresponds substantially to the field of view 310 of the second image capture element 306. In this example, the software generates another virtual box 404 surrounding the position of the user's head in the second image. The distance from the top of the virtual box to the top of the image captured using the second image capture element is a second distance d'. The offset of the images can effectively be determined by determining the difference in these distances, using a formula such as:

$$\text{image offset} = d - d'.$$

If features in the two images are to be aligned, such as to compare the reflections of common features in the two images, then at least one of the images must be adjusted by the amount of image offset.

For certain inputs that do not require precise location or orientation determination, such a basic image offset determination can be adequate. In many cases, however, the existing algorithms for locating an approximate location of a user's head are not sufficiently accurate to be used in tracking features such as the relative position and separation of a user's pupils or other such aspects.

Figure 5A:
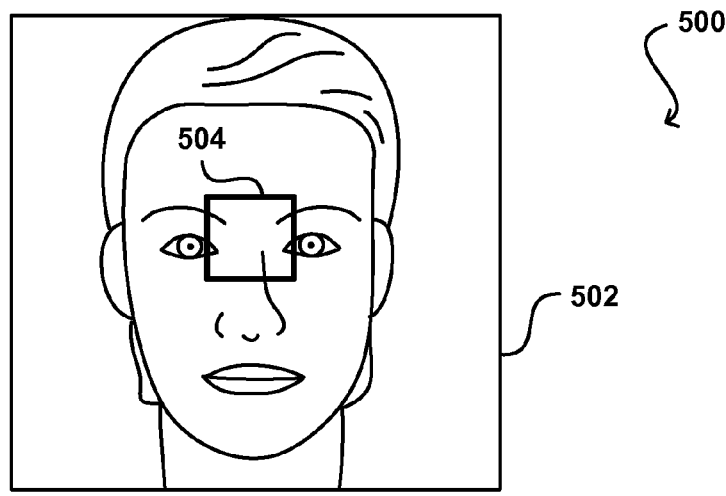
FIGS. 5(a)-(c) illustrate an example process for determining image offset that can be used in accordance with a first embodiment.
Figure 5B:
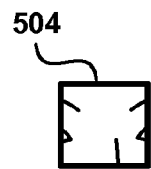
Figure 5C:
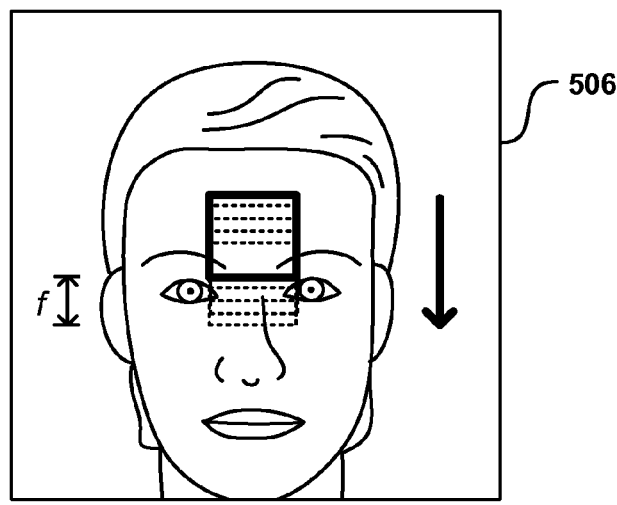

FIGS. 5(a)-5(c) illustrate another example approach 500 that can be used to align images in accordance with various embodiments. In this example the images are shown to be ambient light (or similar) images, but it should be understood that similar approaches could be used with infrared images or other appropriate image files. In FIG. 5(a), a first image 502 is shown that was captured using a first image capture element of a device. An image alignment or similar algorithm can select an appropriate subset 504 of the image, such as a set of pixels in the image that meet a certain criteria, such as a specific position or level of distinctiveness. For example, an algorithm can be configured to select a region that is near the center of the image, such that the matching region will likely be contained within the image captured from the other capture element. Further, the region can be selected based at least in part upon some uniqueness or distinctiveness criterion. For example, selecting a region of a user's forehead might not be optimal as there might be many regions or locations on the user's face that essentially contain only skin of the user, without significant shadows, features, or blemishes. On the other hand, selecting a region that contains at least a portion of each of the user's eyes, as illustrated in the example of FIG. 5(a), can provide a location that will likely only match one location in the other image. Various algorithms exist for determining distinctive features from an image that can be used as well within the scope of the various embodiments. In embodiments where eye location and/or gaze direction of a user is determined as input, however, determining and matching the location of the eyes of a user can have additional benefits, as matching the area around the eyes will reduce the effects of any optical artifacts introduced into the images due to the optics, etc., such as geometric distortion.

FIG. 5(b) illustrates the selected portion 504 of the first image 502 that can be used to attempt to find a matching location in the second image 506, and thus determine the relative image offset. A matching algorithm can start at an appropriate location in the second image 506, such as may correspond to the coordinates where the portion was located in the first image 502. The initial location will likely not match (unless the user was very far away), such that the algorithm will need to adjust the location to determine a match. Since the algorithm can have access to information indicating the relative separation (including direction) of the image capture elements that captured the images, the algorithm can determine the appropriate direction (e.g., down in the example of FIG. 5(c)) to move to attempt to determine a match.

In FIG. 5(c), the selected image portion 504 is first compared with a first position in the second image 506. Although the example shows the selected image portion as being placed over the second image or otherwise positioned with respect to the image, it should be understood that any appropriate technique for comparing image portions can be used, which can involve comparing color or brightness values at corresponding pixel locations, for example, and do not actually perform a visual comparison. In some embodiments, at least a portion of the pixels (or other points or subsets) of the selected image portion 504 are compared with the corresponding portions of the second image, and if the values at those portions at least meet a minimum match threshold, the position can be determined to be the appropriate match position. If the location does not at least meet a minimum match threshold, the position of the selected image portion with respect to the second image can be shifted in the determined direction, and another comparison can be performed. The position can be moved, and matching process repeated, until a location is found that at least meets a minimum matching threshold (or other such criterion), or until the edge of the image (or a maximum range of comparison) is reached. In cases where the user is too close to the device, or where the user moves between image captures, there might not be a sufficient match able to be determined.

In another embodiment, the intensity difference at each pixel location with respect to the selected portion can be determined (e.g., one subtracted from the other). The average difference, or some other measure of the difference, then can be used to determine an overall difference measurement for each location. Using such an approach, the minimum value would instead be used, as the match location would exhibit the lowest average difference between intensity values.

In some approaches, the matching process will compare the images over a minimum range or number of positions, and will determine at least one match score at each location. The distance between locations can be fixed in some embodiments, while in other embodiments the distance between locations (and the number of locations) can be determined at least in part based upon aspects of the one or more images. For example, in some embodiments a relative head size can be determined with respect to the image, such that when the head occupies more of the image the distance between comparison locations can be larger, while images where the head occupies less of the image might require smaller distances between capture locations in order to find an appropriate match location.

Further, since the matching is performed at a discrete set of locations, it is likely that the actual match point will fall at some point between two of the discrete locations. A curve-fitting or similar function can be applied to the match values to attempt to interpolate the precise match position based upon a maximum value position of the curve-fitting function. In some embodiments, the position will be moved until a maximum match point is reached and a minimum number or range of subsequent values have a lower match score, such that the match position likely has already been determined. In other embodiments, the entire range of match positions can be analyzed in order to prevent the inadvertent acceptance of a secondary maximum value in the fit curve.

If an appropriate match location is determined, the offset distance corresponding to the differences in the match location in the two (or more) images can be used to properly align the images (at least mathematically) in order to ensure that the appropriate portions are being analyzed in each image. Such an approach can be particularly important for approaches such as IR retinal reflection, where the determination of retinal position, dimensions, and/or other such aspects relies upon differences between the images at corresponding locations.

Once the images are aligned, one or more algorithms can analyze the images to attempt to determine information about the images, such as the location of specific features in each image. As discussed above, certain embodiments utilize information about the user's eyes to attempt to determine information such as relative movement between the computing device and the user, as well as changes in gaze direction of the user. As discussed, a imaging element of a computing device can capture an image of at least a portion of a user of the device when the user is in front of the device (or at least within the viewing angle of an imaging element of the device), such as would normally occur when the user is viewing the display element of the device.

If the device includes software and/or hardware that is able to locate at least one feature of the user that can be consistently determined, such as the eyes, nose, or mouth of the user, then the device can analyze the image information to determine relative motion over a period of time and utilize that relative motion as input. For example, a user can tilt the device or rotate the user's head, such as to nod up and down, in a "yes" motion. Such motion can be detected and analyzed by the imaging element (e.g., camera) as the position of the user's eyes in the viewable area will move in the images. Further, aspects such as the imaged shape, size, and separation of the user's eyes also can change. Movement of the eyes in the viewable area could also be accomplished by moving the device up and down while the user remains still, as well as through other such motions. In some embodiments, the device is able to distinguish between movement of the user and movement of the device, such as by detecting movement of a background or other aspect of the images, or by analyzing the separation, shape, or size of various features. Thus, in embodiments described anywhere in this description that use an imaging element to determine an orientation or location of the device relative to its user, a user can have an option of inputting a given type of motion, corresponding to a specific command, by moving the device or altering an aspect of the user, or both.

As described above, when using the imaging element of the computing device to detect motion of the device and/or user, the computing device can use the background in the images to determine movement. For example, if a user holds the device at a fixed orientation (e.g., distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation even though the orientation of the device with respect to the user has not changed.

In some cases, relative movement could be open to multiple interpretations. For example, in one application a device might be programmed to perform a first action if the device is moved up and/or down, and a second action if the device is instead tilted forward or backward. As should be apparent, each action can correspond to the position of the user's eyes moving up and/or down in the viewable area. In some embodiments, as will be discussed below, the camera and detection may be sensitive enough to distinguish between the two motions with respect to how the user's face changes in the captured images, such as the shape and separation of various features or other such aspects. In other embodiments, where it may be desirable for the process to utilize a fairly simple imaging element and analysis approach, it can be desirable to include at least one orientation determining element (e.g., an accelerometer or gyro) in the device that is able to determine a current orientation of the device. In one example, the at least one orientation determining element includes at least one single- or multi-axis accelerometer is used that is able to detect factors such as three-dimensional position of the device, the magnitude and direction of movement of the device, as well as vibration, shock, etc. Other elements for detecting orientation and/or movement can be used as well within the scope of various embodiments for use as orientation determining element. When the input from an accelerometer is used with the input from the camera, the relative movement can be more accurately interpreted, allowing for a wider range of input commands and/or a less complex image analysis algorithm. For example, use of an accelerometer can not only allow for distinguishing between lateral and rotational movement with respect to the user, but also can allow for a user to choose to provide input with or without the imaging element. Some devices can allow a user to specify whether input is to be accepted from the imaging element, the orientation determining element, or a combination thereof.

The computing device can store, or otherwise have access to, at least one algorithm to analyze the captured images, as may be stored at least temporarily on the device itself, or can send the images to be analyzed by a remote computer or service, etc. Any of a number of algorithms can be used to analyze images, detect features, and track variations in the positions of those detected features in subsequent images. For example, FIG. 6(a) illustrates an image of a face 600 of a user of a device as could be captured (e.g., obtained or imaged) by an imaging element of the device. Thus, the face 600 is depicted as perceived by the imaging element of the device. As can be seen in FIG. 6(a), and also in the eye-specific view of FIG. 6(b), there are various aspects of the user's face that can be located and measured, such as the perceived width and height of a user's eyes, the perceived relative separation of a user's eyes and the perceived relative position of the user's eyes to an edge of the user's face when facing the device. Any number of other such measurements or aspects can be used as should be apparent. When a user tilts or translates the device, or moves his or her head in any direction, there will be a corresponding change in at least one of these measured aspects in subsequent images that are obtained. For example, if the user tilts his or her head right or left, the horizontal distance f in FIG. 6(a) between the user's eyes and an edge of a side of the user's face will change. In a similar manner, if the user tilts his or her head up or down, the vertical distance g between the user's eyes and an edge of the top of their head will change. Further, the shape or horizontal measurements a and b and the shape or vertical measurements e and h of the user's eyes will change and can change by different amounts. The separation distance c between the eyes can change as well. Using such information, the device can determine a type of motion that occurred and can use this information to help interpret the movement of the user's pupils or other such information.

For example, FIGS. 7(a)-7(c) illustrate the movement of a user's pupils with respect to the user's eye position. In some embodiments, the user's pupil position relative to the user's eye position can be at least partially indicative of the gaze direction of the user. For example, assuming the user is facing toward the device, in FIG. 7(a) the user is gazing forward, while in FIG. 7(b) the user is gazing downward and in FIG. 7(c) the user is gazing to the left (in the figure). Such information by itself, however, may not be sufficient to determine gaze direction. For example, if the user had tilted his or her head up (or back) while making the pupil movement in FIG. 7(b), the user might actually be looking forward (or even 'up' relative to the previous position). Further, if the user translates his or her head to the left or right in FIG. 7(a), but does not adjust the position of the pupils with respect to the user's eyes, then the viewing location would actually change even though the user is still looking straight ahead. Thus, in certain embodiments, it can be advantageous to utilize facial measurement approaches to interpret the pupil movements of FIGS. 7(a)-7(c).

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

In some embodiments, the accuracy of the image capture and detection can be such that gaze direction and/or field of view can be determined based substantially on pupil-related information. In one embodiment, image analysis can be performed to locate the position of the user's pupils. The dimensions of the pupils themselves, as well as position and separation, can be indicative of changes in the user's gazing direction. For example, in addition to determining that pupils move from left to right in adjacently-captured images, the device can determine, due to small changes in the width of each pupil, whether the user position with respect to the device has translated. Similarly, the device can determine whether the user rotated his or her eyes, which would result in changes in diameter since the eyes are spherical and changes in rotation will result in changes in the captured dimensions. By being able to precisely measure pupil-related dimensions, the device can track the field of view of the user with respect to the device.

Another benefit to being able to accurately measure pupil-related dimensions is that the device can also determine a focus depth of the user. For example, if the user focuses on a point "farther away" from the user, the device can detect a change in separation of the pupils. Because the device can also measure the dimensions of the pupils in the image, the device can also determine that the increase was not due to an action such as a decrease in the distance between the user and the device. Such information can be useful for three-dimensional images, for example, as the device can determine not only a viewing location, but also a depth at which the user is focusing in order to determine where the user is looking in three-dimensional space.

While user information such as pupil measurements can be determined through various image analysis approaches discussed above, conventional image analysis algorithms are relatively processor-intensive and can require a significant amount of memory. Conventional portable devices, such as cellular phones and portable media players, might not have the necessary resources to perform such real-time image analysis, particularly at the resolution needed to detect small variations in pupil diameter. Further, in order for the image capture to work there must be a sufficient amount of ambient light, such that if a user is reading an electronic book on a device with a display such as an electronic paper display that does not generate significant illumination as would an LCD or similar display element, there might not be enough light to adequately capture the necessary image information.

FIGS. 8(a)-8(c) illustrate an example process for determining pupil or retina parameters using infrared radiation that can be used in accordance with various embodiments. In this example, a first image is shown in FIG. 8(a) that was captured using a sensor positioned near an infrared source, such that each retina substantially reflects the infrared radiation back towards the sensor. FIG. 8(b) illustrates another image captured using a sensor positioned away from an infrared source, such that any IR radiation reflected by the retinas is not directed towards, or detected by, the sensor. Thus, as can be seen, the major significant difference between the two images is the reflection by the retinas. Using simple image comparison or subtraction algorithms, for example, the retinas can quickly be extracted from the images once the images are aligned using a process such as those discussed above. If noise is sufficiently filtered out, using any appropriate method known in the art, the resultant image in FIG. 8(c) will include substantially only the reflection from the retinas, which can quickly be analyzed with very little resource allocation.

As with the analysis of conventional full-color images described above, however, the resolution of the IR-based approach described above might not be sufficient to track gaze direction or field of view for all applications. In such cases, it can be beneficial to utilize additional input mechanisms and/or additional IR emitters and detectors to help interpret or enhance the captured information. At least some of these additional elements shall be referred to herein as "environment-determining input elements," as the additional elements are operable to determine at least one aspect relating to the environment surrounding the device, such as light or noise surrounding the device, a relative orientation of the device to the surroundings, whether a user is holding the device, etc. While use of IR emitters and detectors are described herein, any type of facial or movement recognition technique may be used with the embodiments described herein.

Figure 9:
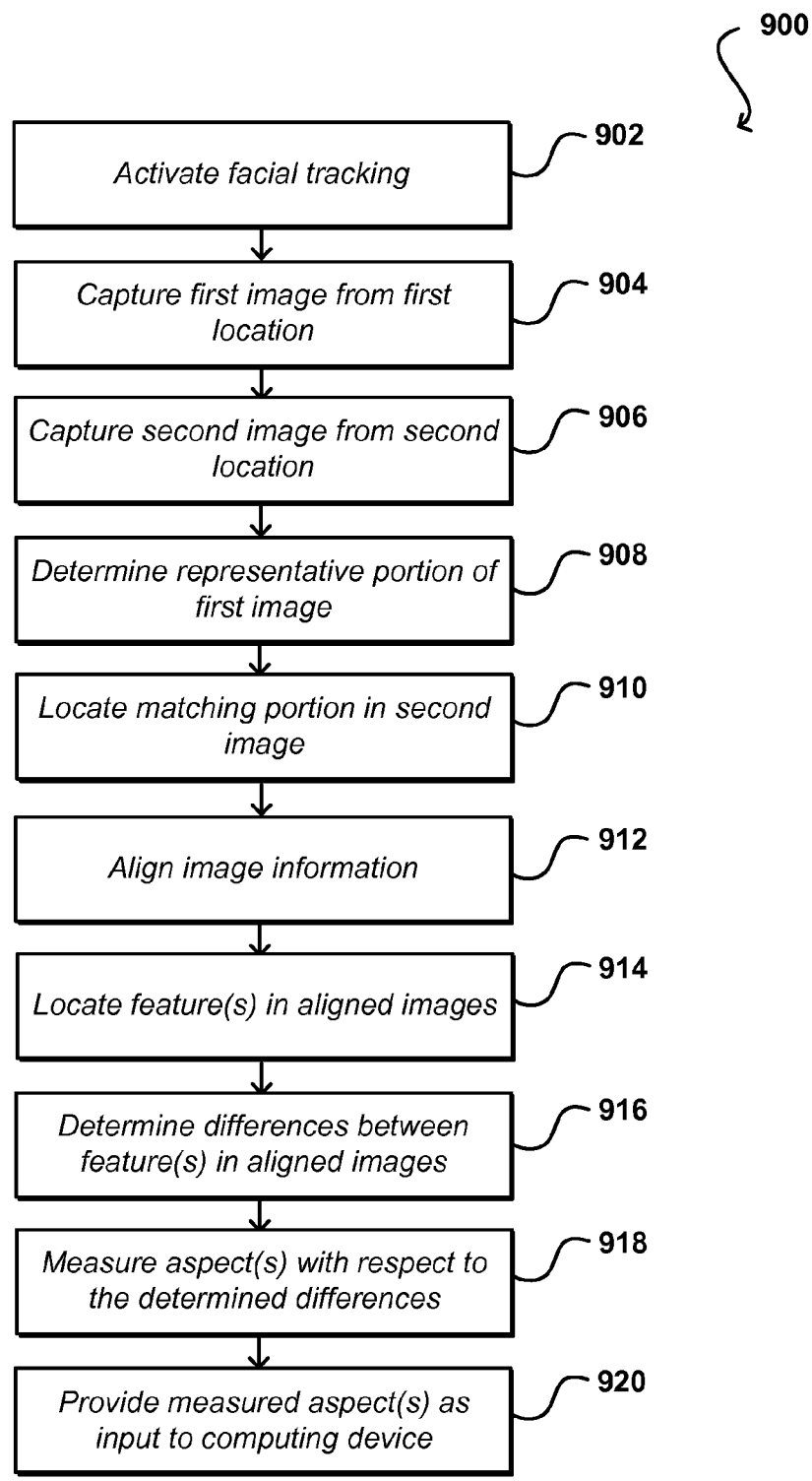
FIG. 9 illustrates an example process for determining relative position of at least one aspect of a user of a computing device that can be used in accordance with a first embodiment.

FIG. 9 illustrates an example process 900 for providing input to a computing device based at least in part on imaged aspects of a user in accordance with one embodiment. As should be understood, the described process is merely an example, and that there can be additional, fewer, or alternative steps performed in similar or alternative orders, or in parallel, in accordance with the various embodiments. In this example, facial tracking (or other relative user position-based tracking as discussed herein) is activated 902, either manually or automatically upon startup or in response to another appropriate action or occurrence, such as opening a particular application on the device. At an appropriate time (such as at regular intervals) a first image is captured from a first location 904, such as by a first image capture element at a first position on the computing device. At another appropriate time (such as concurrent with the first image capture or at a time shortly thereafter), a second image is captured from a second location 906, such as by a second image capture element at a second position on the computing device. As discussed, if infrared radiation is being used to determine retinal reflection, the image capture elements (e.g., IR sensors) should be positioned such that one image capture element will receive IR reflected from a user's retina and the other image capture element will not receive reflected IR. It should be understood, however, that any separation will only work for a range of distance between the user and the device, past which both capture elements can detect reflected IR.

A representative portion of the first image is determined 908, such as by using one or more algorithms to select a unique or distinctive region as discussed above. The size of the selected region can be based upon any of a number of factors, and can be increased in some embodiments until the distinctiveness reaches a minimum level. It can be desirable in certain embodiments to minimize the size of the representative portion, in order to reduce the processing capacity and time needed to locate a matching portion in the second image. Larger portions can result in more accurate results, however, so different algorithms can balance the tradeoff resulting from the size of the portion to be used for matching. An algorithm then can attempt to locate a matching portion in the second image 910, such as by starting at a specified location and moving the representative portion comparison in a direction corresponding to the offset of the capture elements as discussed above. In some embodiments, a different representative portion can be selected if no match is found. In other embodiments, another set of images is captured to attempt to determine a match (such as where there was movement or another occurrence between image captures). Various other approaches can be used as well.

Once a match location is determined, the information for the images can be aligned 912 in order to properly correlate features in the images. At least one feature of interest can be located in the aligned images using image recognition or another such process or algorithm 914. When using IR radiation, for example, the process can attempt to locate the pupils of the user (or any person) captured in the images. When the features of interest are located, an algorithm or process can attempt to determine differences between the features in the aligned images 916. For example, the process can determine the amount of light reflected (and captured) corresponding to the position of the pupil in one image and compare that to the corresponding amount of light captured at the position of the pupil in the second image. An algorithm or process then can measure or calculate at least one aspect with respect to these differences 918, such as the relative separation of a user's pupils, the relative location of the pupils with respect to a previously analyzed image, etc. Information about the measured aspects, such as an amount of movement or change in gaze direction, then can be provided to the computing device as input 920. As discussed, the input can be used by the device in any number of ways to control any of a number of aspects or functionality of the device.

As alluded to above, there can be some inaccuracy built into some of these approaches due to the fact that the images being compared may not be captured simultaneously. For example, in some embodiments a single detector is used to capture images using light of different wavelengths, IR radiation reflected from different IR emitters, or other such sources of reflected radiation. If there is rapid movement during image capture, an offset between images can be difficult to determine, as the positions of features will not be the same in both images, even taking the standard image offset into account. For a device attempting to determine gaze direction based on pupil location in a set of images, the result can be inaccurate as the gaze direction and/or eye position might be different in each image.

It thus can be desirable in at least some embodiments to capture the images with as little delay as possible. An approach in accordance with at least one embodiment takes advantage of the fact that many image capture elements do not capture an entire image simultaneously, as with conventional film-based cameras, but instead capture an image one scan line at a time. Thus, a digital camera, webcam, or other capture element having a sensor array corresponding to potentially millions of pixels can capture an image by scanning from a top row (or scan line) of the array down the array of sensors one row (or scan line) at a time. It should be understood that the orientation in which the sensor array operation is described is presented only for convenience of explanation, and that any appropriate orientation, scan direction, or other aspect or approach can be used as well within the scope of various embodiments.

Figure 10:
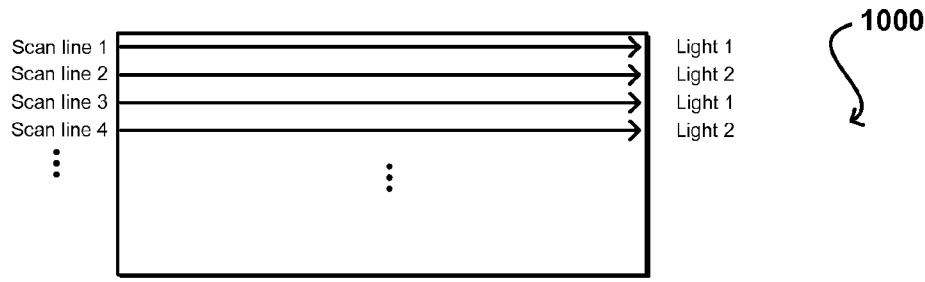
FIG. 10 illustrates an example imaging approach that can be used in accordance with one embodiment.

If the computing device utilizes two radiation sources, such as two infrared emitters of substantially the same wavelength at different positions on the device or two emitters of different wavelength, for example, and if the switching speed of those radiation sources is sufficient, the radiation sources can be turned on and off such that every other scan line captures radiation reflected for one of the radiation sources. For example, FIG. 10 illustrates an example wherein there are a number of scan lines for an image capture element 1000, and the radiation captured for each scan line can be alternated between light sources. In some embodiments, a controller can be in communication with the capture element and the radiation emitters such that the emitters are switched between scan lines of the capture element.

Figure 11:
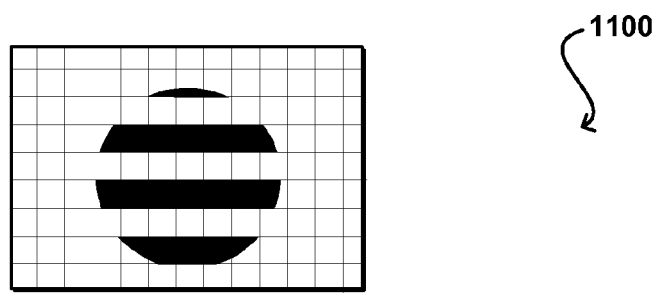
FIG. 11 illustrates an example image that can captured using the approach of FIG. 11.

FIG. 11 illustrates an example of an image 1100 that can be captured using such an approach. In this example, the image captures IR light reflected from the pupil of a user, with a first light source being retro-reflected by the retina and a second, off-axis light source not being reflected to the capture element. As illustrated, a single image can essentially capture information for both light sources simultaneously, although at a slightly lesser resolution. The ability to capture the information in a single image significantly reduces the effects of movement on the position of features imaged using both light sources. Further, using a single capture element can reduce cost and eliminate parallax effects or distortion on the image(s).

As discussed, the time between capturing images using alternating light sources can be drastically reduced. For example, a sensor with 600 rows previously would have to capture all 600 scan lines of an image for one light source before switching to capture information for the other light source. By switching on each scan line, information for the other light source can be captured on the very next scan line, reducing the time between information capture to about 1/600 of the previous time.

In some cases, the emitters may not be able to switch at the speed needed to alternate scan lines for the capture sensor. In one embodiment, the speed between line captures of the sensor can be slowed enough to enable the switching. In another embodiment, there can be more than one source used for each type of light (e.g., orthogonal vs. off-axis or different wavelengths) such that each source can be activated for every fourth or sixth scan line instead of every second scan line, for example. In yet another embodiment, assuming sufficient resolution of the capture sensor, the light sources can be switched every third, fourth, fifth, or six line, etc., instead of every other scan line. Such an approach can enable the information to be captured for two or more light sources in a single image, while still using a conventional capture element and accounting for the switching speed of the light sources. Other timing factors can be considered as well, such as edges (e.g., ramp-up times or tails) of the intensity of the light from a given source, as the source will not have perfect "on" and "off" transitions, or hard edges, but will take a short period of time to turn on and off.

Figures 12A, 12B:
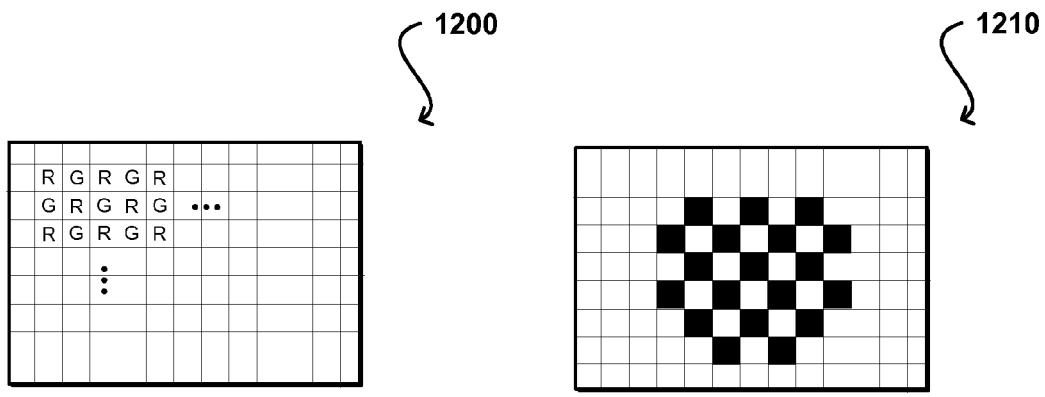
FIGS. 12(a) and (b) illustrate an example imaging approach that can be used in accordance with one embodiment.

FIGS. 12(a) and 12(b) illustrate another example approach to distinctively capturing light reflected from more than one light source in a single image that can be used in accordance with at least one embodiment. Color filters such as Bayer filters are known in the art for selectively capturing light of a specific color at certain pixels of a sensor array, particularly for single-chip digital image sensors. Traditional Bayer filters include red, blue, and green filters (with twice as many green filters as red and blue filters), such that adjacent sensors will capture the intensity of light of different colors, and the array as a whole will only capture intensity of light for those three colors.

Approaches in accordance with various embodiments can utilize a different type of filter to selectively capture radiation reflected at different wavelengths. As discussed, a computing device can utilize two radiation sources, with one source in the range of wavelengths that is reflected by the human retina and another source in the range of wavelengths that is not reflected by the human retina (or that is absorbed by the cornea, for example). FIG. 12(a) illustrates an example filter 1200 that can be used with such a device. In this example "R" is used to refer to light of a first wavelength range and "G" is used to refer to light of a second wavelength range, but it should be understood that these letters are merely selected for convenience and do not infer specific requirements on the wavelength range of the filter. Further, although a substantially equal distribution of filter elements is shown for both ranges, it should be understood that the distribution can be uneven as well in other embodiments.

Using such a filter 1200, two radiation sources of different wavelengths, a single wide-band radiation source, or another such source of multiple wavelength radiation can be used to simultaneously illuminate the face of a user (or other aspect of an object or element of interest). Using the filter, a single image can be captured using a single sensor (e.g., a conventional CCD or CMOS sensor) that will reflect information for both wavelength ranges. For example, FIG. 12(b) illustrates an example image 1210 corresponding to the reflected light from a user's retina that can be captured using such an approach. As illustrated, adjacent pixels (or groups of pixels) indicate the intensity of light from each of the two wavelength ranges. In this example, the first wavelength range that is reflected from the retina is shown by dark areas in the image, while the corresponding second wavelength range that is not reflected by the retina does not appear dark at those positions in the image. If the resolution of the sensor array (and filter) is sufficient, this single image can be used to locate the position, size, and other aspects of a user's pupils (and other such objects).

Although many of the embodiments above provide for aligning images or capturing images that include distinguishable information for at least two sources, such approaches still can be insufficient in at least some embodiments to provide the level of precision needed to accurately provide input to a device. For example, if the device is tracking gaze direction then the device might need to also know how far away the user is from the device, in order to determine the appropriate angle corresponding to a lateral shift in position of the user's pupils. For example, a user a foot a way from the device will show a much different change in pupil position in a captured image than a user three feet away from the device, even though the actual physical amount of movement might be the same. While aspects such as the separation and size of the pupils can be an indication of distance, variations between users (e.g., adults versus small children) can affect the precision of such determinations.

Figure 13A:
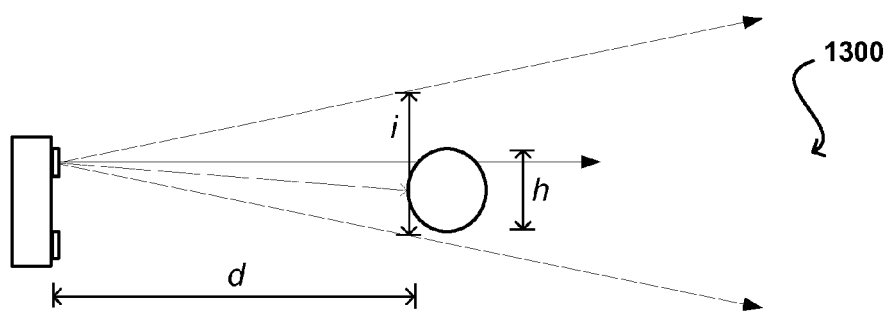
FIGS. 13(a)-(e) illustrate an example process for determining distance to a user based on image offset that can be used in accordance with a first embodiment.
Figure 13B:
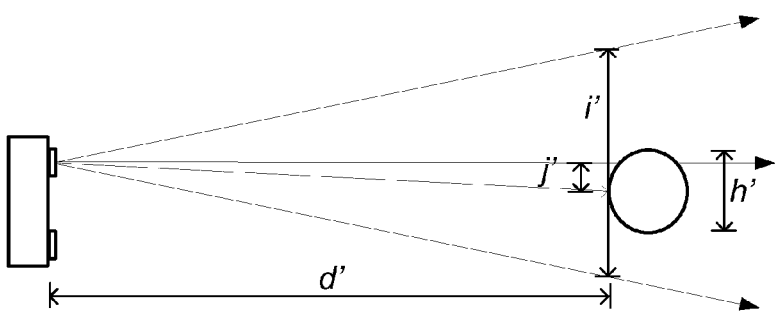

Accordingly, it can be desirable in at least some embodiments to also determine the distance to a user captured in the images. In some cases, a relative distance can be determined at least in part by determining the apparent size of an object in the image with the known size (or an approximate size) of the object. For example, as illustrated in the example 1300 of FIG. 13(a), the distance to an object with height (in the figure) h will affect how large the object appears in the image. At a first distance d, the image height (based on the field of view at a current level of zoom) will be a height i, and the relative size of the object in the image will be given by h/i, where in FIG. 13(a) the object takes up approximately 50% of the height of the image. As illustrated in FIG. 13(b), as the distance to the object increases to a distance d', the image height for the field of view at that distance is a larger height i', but the height of the object is the same. The apparent height of the object in the image will decrease, however, as the ratio of h/i now yields a value of approximately 30% of the overall height in the image. For objects with known height captured with a capture element with a known field of view, for example, an algorithm can determine an approximate distance to that object based on the relative size of the object in the image.

In many cases, however, the precise size of the object might not be known. For example, multiple users might utilize the device where each user can have features of different sizes. Further, users might alter their appearance, such as by changing a hair style, growing facial hair, or putting on weight, such that the calculation can be imprecise even for a known user.

Figure 13C:
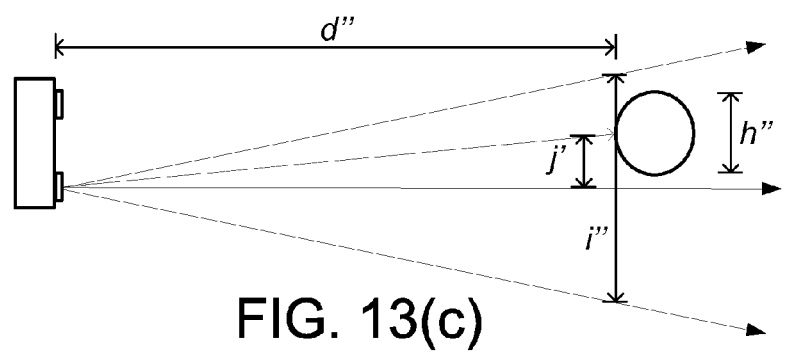

Several embodiments discussed above capture images of a common object (e.g., a user) from multiple angles. Using parallax-type information, it is possible to get an improved measure of distance by utilizing a parallax analysis of the relative displacement or offset of the object between the images. For example, in FIG. 13(b) the distance from the center of the image to the center of the object (or a feature at the front center of the object) is given by a distance j. FIG. 13(c) shows the field of view for the second image capture element, separated a distance from the first image capture element. As can be seen, the distance from the center of the second image to the center of the object is a different distance, here a distance j'. As should be understood, the directions of the offsets can be the same or opposite in the images. The values of j and j' will necessarily increase with an increase in distance to the object. Thus, a determination of distance can be measured using the offset of a feature position in the two images. An advantage to such an approach is that the actual size of the feature does not matter as long as a consistent point is determined for the feature in each image that can be used to determine the offset.

Figure 13D:
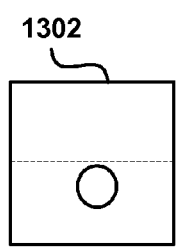
Figure 13E:
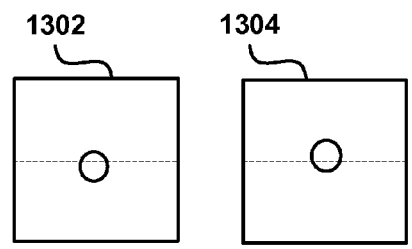

In some cases, a combination of such approaches can be used to improve accuracy. For example, the information that can be obtained from an image can be limited to at least some extent by the resolution of the imaging element. Thus, combining distance measurement approaches in some embodiments can provide a more precise determination of distance. For example, FIG. 13(d) illustrates a first image 1302 and a second image 1304 of an object taken at a first distance, captured with respective first and second image capture elements. FIG. 13(e) illustrates the same first image 1302 and second image 1304 captured with the object at a second distance, greater than the first distance. As can be seen, the overall offset (the sum of j+j') of the object in FIG. 13(d) is greater than the overall offset (the sum of j+j') of the object in FIG. 13(e). Thus, through proper calibration and analysis the device can make a first determination of distance based on the relative offset, which changes in proportion to the distance to the object. Also as can be seen, the apparent size of the object changes between FIG. 13(d) and FIG. 13(e). In embodiments where the device tracks the object, changes in apparent size also can be indicative of distance to the object. In embodiments where a user is recognized, such as through facial recognition or another such process, the apparent size also can be used to determine an initial distance to the user captured in a first image or set of images. In some embodiments, both approaches can be used and the results combined, with or without any weighting. As should be apparent, embodiments can use one or both of these approaches, and/or can combine one or both of these approaches with at least one other measurement approach known for such purposes.

Not all computing devices contain two emitters or detectors (or other such devices) positioned a sufficient distance apart on a device to determine distance using parallax. Still other devices might not rely solely (or at all) upon parallax to determine distance to a user or other object of interest. Accordingly, certain devices can utilize other mechanisms (in addition or alternative to apparent size in captured images) to attempt to determine distance.

Figure 14:
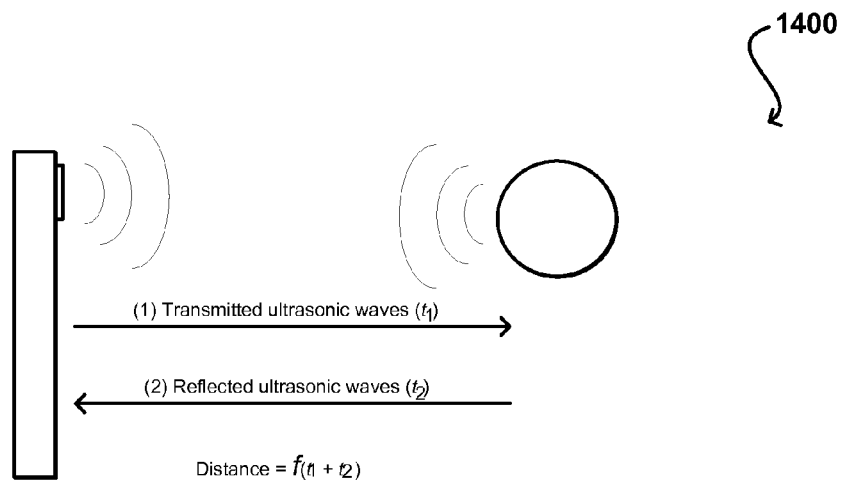
FIG. 14 illustrates an example approach for determining distance to a user being imaged that can be used in accordance with one embodiment.

FIG. 14 illustrates an example configuration 1400 that can be used in accordance with at least one embodiment, wherein the device includes an ultrasonic transceiver (or other such element(s)) capable of emitting a sonic pulse and detecting the reflected sonic pulse. As known in the art, since the speed of sound in a standard atmosphere is known within a degree of certainty, the distance to an object can be determined by measuring the amount of time needed for the pulse to travel to the object, be reflected by the object, and travel back to the ultrasonic device. As illustrated in FIG. 14, if the time it takes for a transmitted ultrasonic wave to reach the face of a user is $t_1$, and the time it takes for the reflected ultrasonic wave to arrive back at the device is $t_2$, then the distance to the object can be determined as a function of the sum of those times, or $f(t_1+t_2)$. Approaches for determining distance based on the time of travel of a reflected wave are well known in the art and will not be discussed in detail herein.

Figure 15A:
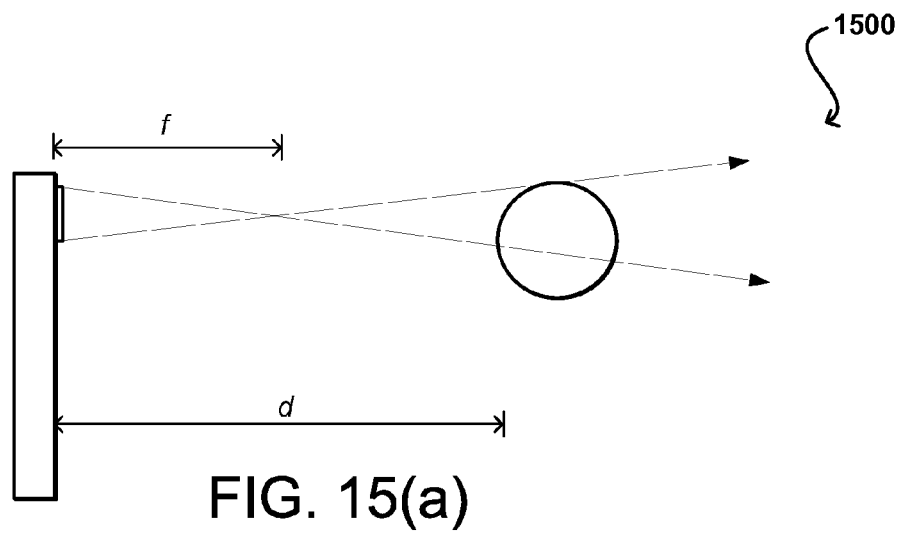
FIGS. 15(a) and (b) illustrate an example approach for determining distance based on optical focus that can be used in accordance with one embodiment.
Figure 15B:
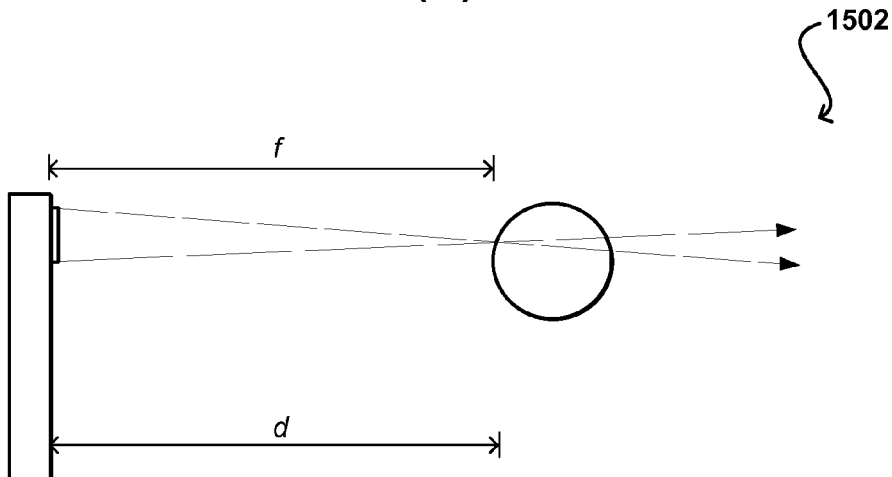

Such an approach still may not provide the desired level of precision in all cases, however, as there is a period of time needed for the ultrasonic wave to travel to the object and back, and any significant relative movement of the user (or other object of interest) during that time can affect the accuracy of the distance determination. FIGS. 15(a) and 15(b) illustrate an example approach that can be used in accordance with at least one other embodiment. The image capture components of certain computing devices can contain automated focusing optics which can adjust an effective focal length of the image capture component in order to focus on the object of interest. In the example configuration 1500 of FIG. 15(a), the effective focal length f is shown to be too short, such that an object at a distance d will likely not be in focus, or will be at least somewhat out of focus. In the configuration 1502 of FIG. 15(b), the optical elements have been adjusted such that the focal length f of the image capture element substantially equals the distance d to the object of interest, such that the object is substantially in focus. In addition to ensuring that the object is in focus, the adjustment in effective focal length also can provide a measure of the distance to the object of interest, as in this case f=d.

Thus, through careful calibration (and possibly periodic recalibration) of the imaging optics, an algorithm or process can determine the approximate distance to an object based at least in part on the effective focal length. In some embodiments, an ambient camera might be used to focus on the user (and potentially provide other information such as user identity), and an infrared configuration might be used to detect gaze direction. Various other approaches can be used as well as discussed elsewhere herein. An advantage to such an approach is that the determination of distance and the capture of an image can be substantially simultaneous, such that movement of the user will not significantly impact the measurements. In some embodiments the focus will automatically adjust and track the position of the user, such that the position will be substantially accurate as long as the user does not move faster than the focusing optics can adjust. In some embodiments, the device can determine when an image was captured while a user was moving or otherwise out of focus, and that image can be discarded and/or a new image captured when the user is back in focus. Other methods for tracking and determining accuracy can be used as well within the scope of the various embodiments.

A number of other approaches can be used as well within the scope of the various embodiments. For example, thermal imaging or another such approach could be used to attempt to determine and track the position of at least some aspect of a human user. In many instances the imaging system is desired to be small and cheap enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, can allow these relatively inexpensive cameras to be used as IR detectors.

Other conventional elements can be used to reduce the cost of a computing device able to perform approaches discussed herein, but might be less accurate and/or might require a larger device. For example, images can be split using beam splitters (e.g., silvered mirrors) such that half of the reflected light gets reflected to a different location (e.g., part of a sensor). Similarly, various optical elements such as an optical interferometer can be used to attempt to obtain accurate distance measurements.

As discussed with any optical approach, it can be desirable to perform at least an initial calibration procedure, as well as potentially additional and/or periodic recalibration. In one embodiment where two cameras are used, it can be advantageous to periodically capture images of a grid or similar pattern in order to calibrate for bends or physical changes in the optics. In some embodiments where an initial calibration is performed during the manufacturing process, the user might only need to have the device recalibrated when performance begins to degrade, or at any other appropriate time.

Figure 16:
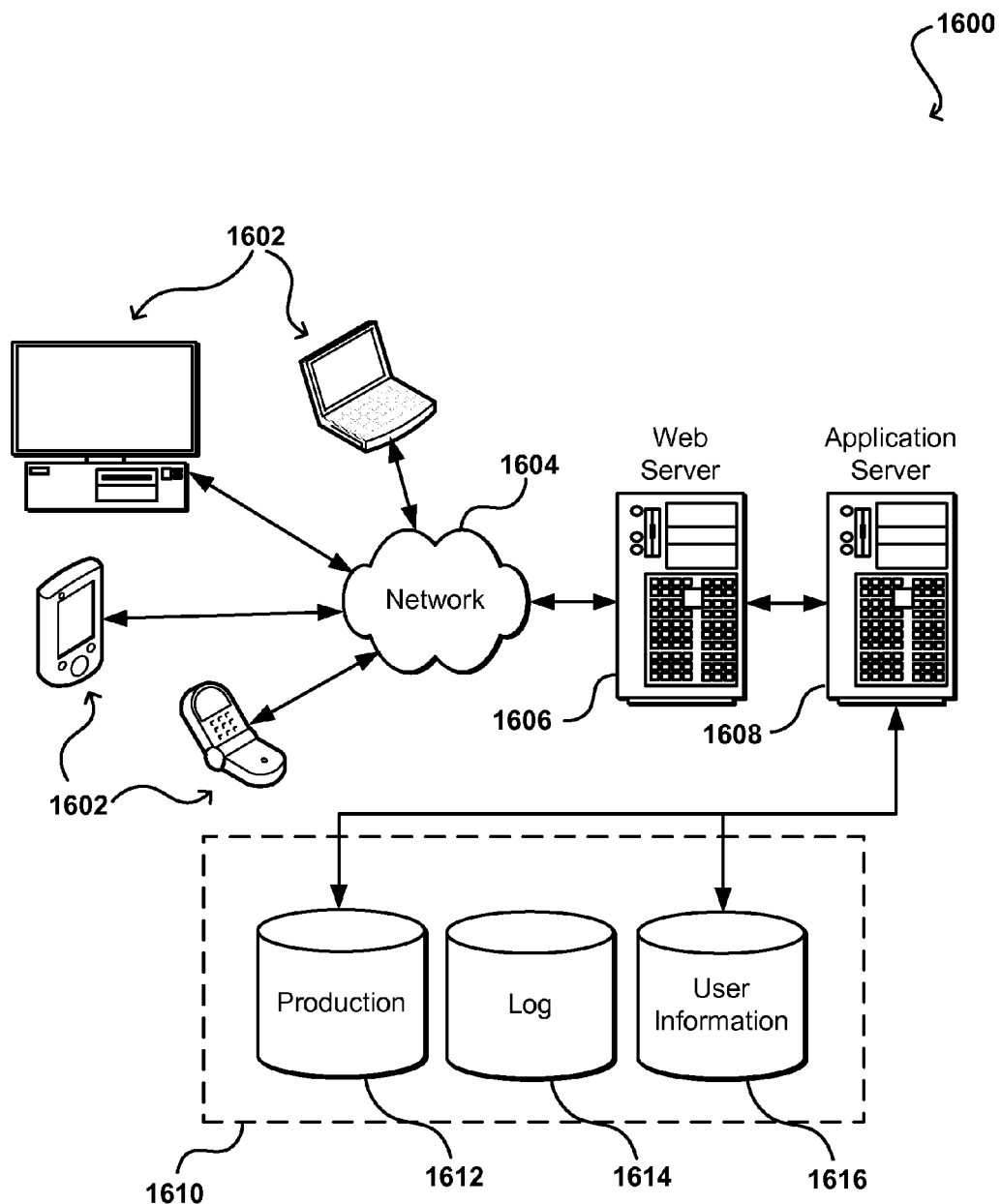
FIG. 16 illustrates an example an environment in which various embodiments can be implemented.

A computing device used for such purposes can operate in any appropriate environment for any appropriate purpose known in the art or subsequently developed. Further, various approaches discussed herein can be implemented in various environments for various applications or uses. For example, FIG. 16 illustrates an example of an environment 1600 for implementing aspects in accordance with various embodiments. As will be appreciated, although a Web-based environment is used for purposes of explanation, different environments may be used, as appropriate, to implement various embodiments. The environment 1600 shown includes a variety of electronic client devices 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. Each client device can be capable of running at least one motion or orientation-controlled interface as discussed or suggested herein. In some cases, all the functionality for the interface will be generated on the device. In other embodiments, at least some of the functionality or content will be generated in response to instructions or information received from over at least one network 1604.

The network 1604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a primary content provider 1606 and a supplemental content provider 1608. Each provider can include at least one Web server 1606 for receiving requests from a user device 1602 and serving content in response thereto, although for other networks an alternative device serving a similar purpose could be used as would be apparent to one of ordinary skill in the art.

Each content provider in this illustrative environment includes at least one application server 1612, 1614, 1622 or other such server in communication with at least one data store 1616, 1618, 1624. It should be understood that there can be several application servers, layers, and/or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. An application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1602 and an application server, can be handled by the respective Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, the page data store 1616 illustrated includes mechanisms for storing page data useful for generating Web pages and the user information data store 1618 includes information useful for selecting and/or customizing the Web pages for the user. It should be understood that there can be many other aspects that may need to be stored in a data store, such as access right information, which can be stored in any of the above listed mechanisms as appropriate or in additional mechanisms in the data store. Each data store is operable, through logic associated therewith, to receive instructions from a respective application server and obtain, update, or otherwise process data in response thereto. In one example, a user might submit a search request for a certain type of content. In this case, the data store might access the user information to verify the identity of the user, and can access the content information to obtain information about instances of that type of content. The information then can be returned to the user, such as in a results listing on a Web page that the user is able to view via a browser on the user device 1602. Information for a particular instance of content can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature, and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of enabling a user to provide a control input to an electronic device, comprising:
under control of one or more computing systems configured with executable instructions,
illuminating, by a first infrared (IR) source of the electronic device, at least a portion of a face;
illuminating, by a second IR source of the electronic device, at least the portion of the face;
determining that a third IR sensor is covered, based at least in part on the third IR sensor not receiving reflected IR light;
capturing, by a first IR sensor at a first time, a first image including reflected IR light from the first IR source;

capturing, by a second IR sensor at the first time, a second image including reflected IR light from the second IR source;

determining a first portion of the first image, the first portion including facial features that meet a minimum level of distinctiveness;

locating a second portion of the second image, the second portion of the second image corresponding to the first portion of the first image;

aligning the first portion of the first image and the second portion of the second image, based at least in part on first information;

determining a first position of the face based at least on the first image;

determining a second position of the face based at least on the second image;

determining a relative position of the face based at least on a difference between the first position of the face and the second position of the face; and determining a control input for the electronic device based on the relative position of the face.

2. The computer-implemented method of claim 1, wherein the first information includes information relating to at least a color, a brightness, a hue, a light level, one or more coordinates, or a pixel.

3. The computer-implemented method of claim 1, wherein aligning the first portion of the first image and the second portion of the second image further comprises:

identifying a first target portion in the second image based at least in part on one or more coordinates of the first portion of the first image;

determining that a first match score between the first portion of the first image and the first target portion in the second image is lower than a threshold match score;

identifying a second target portion in the second image;

determining that a second match score between the first portion of the first image and the second target portion in the second image is above the threshold match score; and using the second target portion in the second image as the second portion of the second image.

4. The computer-implemented method of claim 1, wherein determining the first portion of the first image further comprises:

determining a first size of the first portion of the first image;

determining that the facial features included in the first portion of the first image do not meet the minimum level of distinctiveness;

determining a second portion of the first image, the second portion having a second size, the second size larger than the first size;

determining that the facial features included in the second portion of the first image meet the minimum level of distinctiveness; and using the second portion of the first image in place of the first portion of the first image.

5. The computer-implemented method of claim 1, further comprising determining an approximate distance between the electronic device and the portion of the face based at least on the first portion of the first image and the second portion of the second image.

6. The computer-implemented method of claim 1, further comprising:

illuminating, by a third IR source of the electronic device, at least the portion of the face; and capturing, by a fourth IR sensor, a third image including reflected IR light from the third IR source.

7. The computer-implemented method of claim 1, further comprising:

capturing, by a camera, an ambient light image including at least the portion of the face;

determining an approximate head position of the face with respect to the electronic device based at least in part upon the ambient light image; and determining the relative position of the face based at least on the ambient light image, the first portion of the first image and the second portion of the second image.

8. The computer-implemented method of claim 1, further comprising:

illuminating, by a third IR source of the electronic device, at least the portion of the face; and capturing, by the second IR sensor, a third image including reflected IR light from the third IR source.

9. The computer-implemented method of claim 1, further comprising:

illuminating, by the first IR source, radiation within a first range of wavelengths capable of being substantially reflected by areas of the face; and illuminating, by the second IR source, radiation with a second range of wavelengths capable of being substantially absorbed by the areas of the face.

10. A computing device, comprising:

a first infrared (IR) source;

a second IR source;

a first IR sensor;

a second IR sensor;

a third IR sensor;

at least one processor;

memory including non-transitory instructions that, when executed by the processor, cause the computing device to:

illuminate, by the first IR source, at least a portion of a face;

determine that the third IR sensor is not receiving reflected IR light;

determine, based at least on the third IR sensor not receiving reflected IR light that the third IR sensor is covered;

illuminate, by the second IR source, at least the portion of the face;

capture, by the first IR sensor at a first time, a first image including reflected IR light from the first IR source;

capture, by the second IR sensor at the first time, a second image including reflected IR from the second IR source;

determine a first portion of the first image, the first portion including facial features that meet a minimum level of distinctiveness;

locate a second portion of the second image, the second portion of the second image corresponding to the first portion of the first image;

align the first portion of the first image and the second portion of the second image, based at least in part on first information;

determine a first position of the face based at least on the first image;

determine a second position of the face based at least on the second image;

determine a relative position of the face based at least on a difference between the first position of the face and the second position of the face; and determine a control input for the computing device based on the relative position of the face.

11. The computing device of claim 10, wherein the first information includes information relating to at least a color, a brightness, a hue, a light level, one or more coordinates, or a pixel.

12. The computing device of claim 10, wherein the memory further includes non-transitory instructions that cause the computing device to:
   identify a first target portion in the second image based at least in part on one or more coordinates of the first portion of the first image;
   determine that a first match score between the first portion of the first image and the first target portion in the second image is lower than a threshold match score;
   identify a second target portion in the second image;
   determine that a second match score between the first portion of the first image and the second target portion in the second image is above the threshold match score; and
   use the second target portion in the second image as the second portion of the second image.

13. The computing device of claim 10, wherein the memory further includes non-transitory instructions that cause the computing device to:
   determine a first size of the first portion of the first image;
   determine that the facial features included in the first portion of the first image do not meet the minimum level of distinctiveness;
   determine a second portion of the first image, the second portion having a second size, the second size larger than the first size;
   determine that the facial features included in the second portion of the first image meet the minimum level of distinctiveness; and
   use the second portion of the first image in place of the first portion of the first image.

14. The computing device of claim 10, wherein the first IR sensor is positioned substantially adjacent to the first IR source, and the second IR sensor is positioned substantially adjacent to the second IR source.

15. The computing device of claim 10, wherein the first IR source emits radiation within a first range of wavelengths capable of being substantially reflected by areas of the face, and wherein the second IR source emits radiation within a second range of wavelengths capable of being substantially absorbed by the areas of the face.

16. The computing device of claim 10, further comprising:
   a third IR source,
   wherein the memory further includes non-transitory instructions that cause the computing device to:
      illuminate, by the third IR source, at least the portion of the face; and
      capture a third image using the first IR sensor, the third image including reflected IR from the third IR source.

17. The computing device of claim 10, wherein the memory further includes non-transitory instructions that cause the computing device to:
   determine an approximate distance between the computing device and the portion of the face based at least on the first portion of the first image and the second portion of the second image.

18. The computing device of claim 10, further comprising:
   a third IR source,
   wherein the memory further includes non-transitory instructions that cause the computing device to:
   determine that the third IR sensor is not receiving reflected IR light from the third IR source.

19. The computing device of claim 10, further comprising:
   a camera,
   wherein the memory further includes non-transitory instructions that cause the computing device to:
   capture, using the camera, at least one ambient light image including at least the portion of the face; and
   determine an approximate head position of the face with respect to the computing device based at least in part upon the at least one ambient light image.

* * * * *